United States Patent
Hayashi et al.

(10) Patent No.: US 10,264,162 B2
(45) Date of Patent: Apr. 16, 2019

(54) IMAGE FORMING SYSTEM, IMAGE READING APPARATUS, AND IMAGE FORMING APPARATUS INCLUDING MEANS FOR DETERMINING A TEMPERATURE DISTRIBUTION IN A PAPER MEDIUM

(71) Applicant: Konica Minolta, Inc., Tokyo (JP)

(72) Inventors: Kenichi Hayashi, Anjo (JP); Yohei Yamada, Toyokawa (JP); Yukinobu Iguchi, Hamamatsu (JP); Satoru Sasaki, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/659,116

(22) Filed: Jul. 25, 2017

(65) Prior Publication Data
US 2018/0048788 A1   Feb. 15, 2018

(30) Foreign Application Priority Data

Aug. 9, 2016 (JP) ................................. 2016-156337

(51) Int. Cl.
*H04N 1/60* (2006.01)
*G01K 11/12* (2006.01)
*H04N 1/00* (2006.01)

(52) U.S. Cl.
CPC .......... *H04N 1/6044* (2013.01); *G01K 11/12* (2013.01); *H04N 1/00814* (2013.01); *H04N 1/6033* (2013.01); *H04N 2201/0094* (2013.01)

(58) Field of Classification Search
CPC combination set(s) only.
See application file for complete search history.

(56) References Cited

U.S. PATENT DOCUMENTS 5,416,613 A * 5/1995 Rolleston ........... H04N 1/00002
356/243.5
8,406,644 B2 * 3/2013 Motoi ................ G03G 15/0415
399/51

(Continued)

FOREIGN PATENT DOCUMENTS

JP    2010088058 A    4/2010
JP    2011027720 A    2/2011
(Continued)

*Primary Examiner* — Barbara D Reinier
(74) *Attorney, Agent, or Firm* — Lucas & Mercanti, LLP

(57) ABSTRACT

An image forming system includes: an image forming apparatus; and an image reading apparatus that reads an image, wherein temperature correction patches with the same color are formed at a reference position and a comparison position, the image reading apparatus includes: a scanner that reads respective colors of the temperature correction patches at the reference position and at the comparison position; and a colorimeter that performs colorimetry to the temperature correction patch at the reference position, the image forming apparatus includes: a detector that detects a temperature of the temperature correction patch at the reference position; a first calculator that calculates a color difference of color values of the temperature correction patches at the reference position and at the comparison position; and a second calculator that calculates a temperature distribution, and as a temperature difference between a first position and a second position increases, the color difference increases.

22 Claims, 16 Drawing Sheets

(56) References Cited

U.S. PATENT DOCUMENTS

| | | | | |
|---|---|---|---|---|
| 8,625,175 B2* | 1/2014 | Hatori | .................. | G01J 3/02 |
| | | | | 358/1.9 |
| 9,967,419 B2* | 5/2018 | Ooishi | .............. | H04N 1/00984 |
| 2009/0296091 A1* | 12/2009 | Skinner | .................. | G01J 3/52 |
| | | | | 356/402 |
| 2011/0255105 A1* | 10/2011 | Hatori | .................. | G01J 3/02 |
| | | | | 358/1.9 |
| 2012/0086962 A1* | 4/2012 | Klassen | .............. | H04N 1/6033 |
| | | | | 358/1.9 |
| 2013/0094040 A1* | 4/2013 | Tomii | ................ | H04N 1/00023 |
| | | | | 358/1.9 |
| 2013/0136474 A1* | 5/2013 | Itagaki | .............. | G03G 15/2039 |
| | | | | 399/49 |
| 2016/0231670 A1* | 8/2016 | Takahashi | ................ | G01J 3/524 |
| 2016/0366296 A1* | 12/2016 | Isokawa | ............. | H04N 1/00724 |
| 2016/0373603 A1* | 12/2016 | Ooishi | ............. | H04N 1/00984 |
| 2017/0251129 A1* | 8/2017 | Sakatani | ............. | H04N 1/6033 |

FOREIGN PATENT DOCUMENTS

| | | |
|---|---|---|
| JP | 2012514739 A | 6/2012 |
| JP | 2013080129 A | 5/2013 |

\* cited by examiner

FIG. 6

| | ΔE | | Temperature |
|---|---|---|---|
| 1 | ΔE = 0.30 | | TEMPERATURE = −5.00°C (35.00°C) |
| 2 | ΔE = 0.28 | | TEMPERATURE = −4.67°C (35.33°C) |
| 3 | ΔE = 0.26 | | TEMPERATURE = −4.33°C (35.67°C) |
| 4 | ΔE = 0.24 | | TEMPERATURE = −4.00°C (36.00°C) |
| 5 | ΔE = 0.22 | | TEMPERATURE = −3.67°C (36.33°C) |
| 6 | ΔE = 0.20 | | TEMPERATURE = −3.33°C (36.67°C) |
| 7 | ΔE = 0.18 | | TEMPERATURE = −3.00°C (37.00°C) |
| 8 | ΔE = 0.16 | | TEMPERATURE = −2.67°C (37.33°C) |
| 9 | ΔE = 0.14 | | TEMPERATURE = −2.33°C (37.67°C) |
| 10 | ΔE = 0.12 | | TEMPERATURE = −2.00°C (38.00°C) |
| 11 | ΔE = 0.10 | | TEMPERATURE = −1.67°C (38.33°C) |
| 12 | ΔE = 0.08 | | TEMPERATURE = −1.33°C (38.67°C) |
| 13 | ΔE = 0.06 | | TEMPERATURE = −1.00°C (39.00°C) |
| 14 | ΔE = 0.04 | | TEMPERATURE = −0.67°C (39.33°C) |
| 15 | ΔE = 0.02 | | TEMPERATURE = −0.33°C (39.67°C) |
| 16 | ΔE = 0.00 (REFERENCE) | | TEMPERATURE =  0.00°C (40.00°C) |
| 17 | ΔE = 0.02 | | TEMPERATURE = −0.33°C (39.67°C) |
| 18 | ΔE = 0.04 | | TEMPERATURE = −0.67°C (39.33°C) |
| 19 | ΔE = 0.06 | | TEMPERATURE = −1.00°C (39.00°C) |
| 20 | ΔE = 0.08 | | TEMPERATURE = −1.33°C (38.67°C) |
| 21 | ΔE = 0.10 | | TEMPERATURE = −1.67°C (38.33°C) |
| 22 | ΔE = 0.12 | | TEMPERATURE = −2.00°C (38.00°C) |
| 23 | ΔE = 0.14 | | TEMPERATURE = −2.33°C (37.67°C) |
| 24 | ΔE = 0.16 | | TEMPERATURE = −2.67°C (37.33°C) |
| 25 | ΔE = 0.18 | | TEMPERATURE = −3.00°C (37.00°C) |
| 26 | ΔE = 0.20 | | TEMPERATURE = −3.33°C (36.67°C) |
| 27 | ΔE = 0.22 | | TEMPERATURE = −3.67°C (36.33°C) |
| 28 | ΔE = 0.24 | | TEMPERATURE = −4.00°C (36.00°C) |
| 29 | ΔE = 0.26 | | TEMPERATURE = −4.33°C (35.67°C) |
| 30 | ΔE = 0.28 | | TEMPERATURE = −4.67°C (35.33°C) |
| 31 | ΔE = 0.30 | | TEMPERATURE = −5.00°C (35.00°C) |

TEMPERATURE CORRECTION PATCH

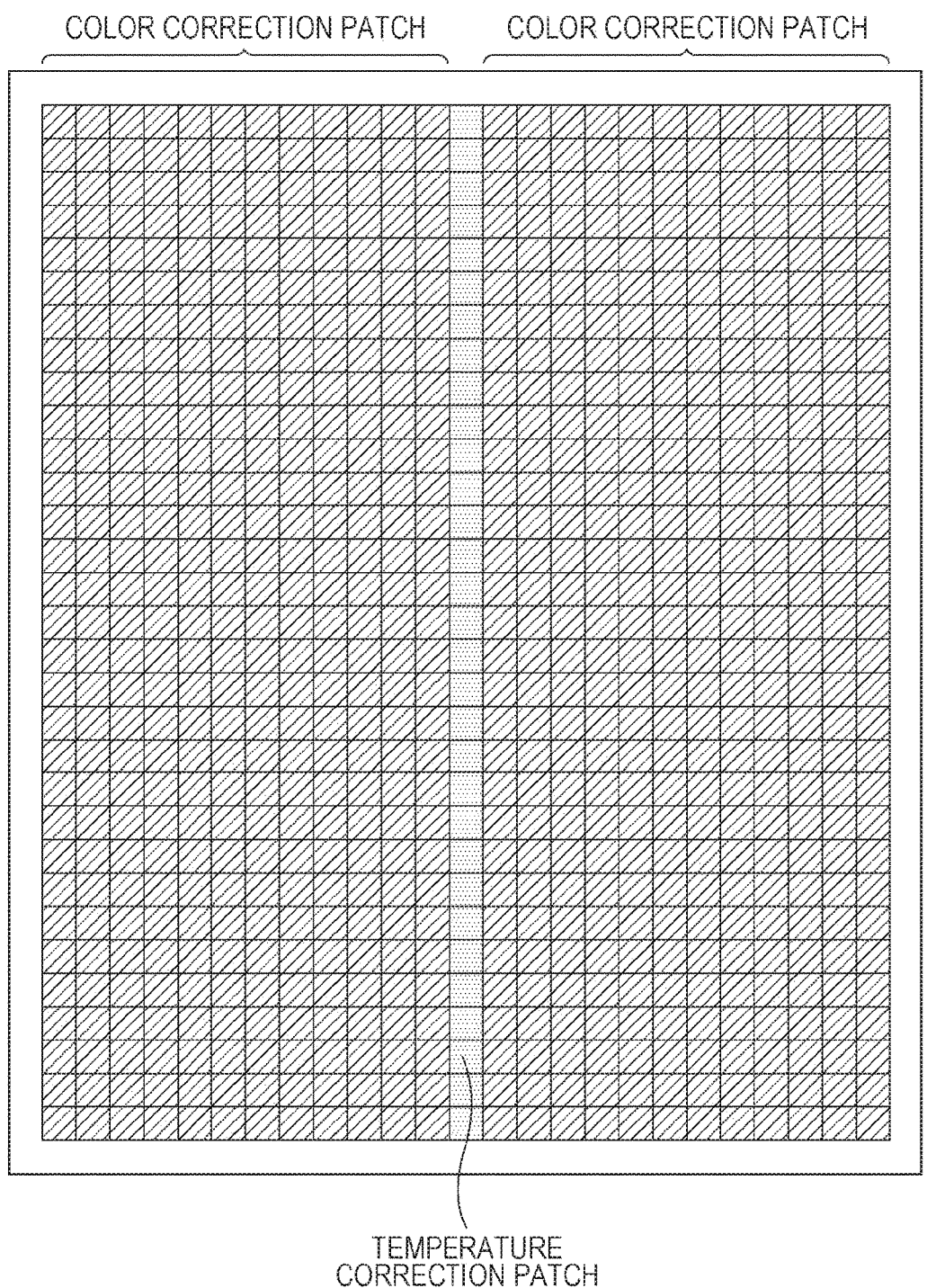

FIG. 9
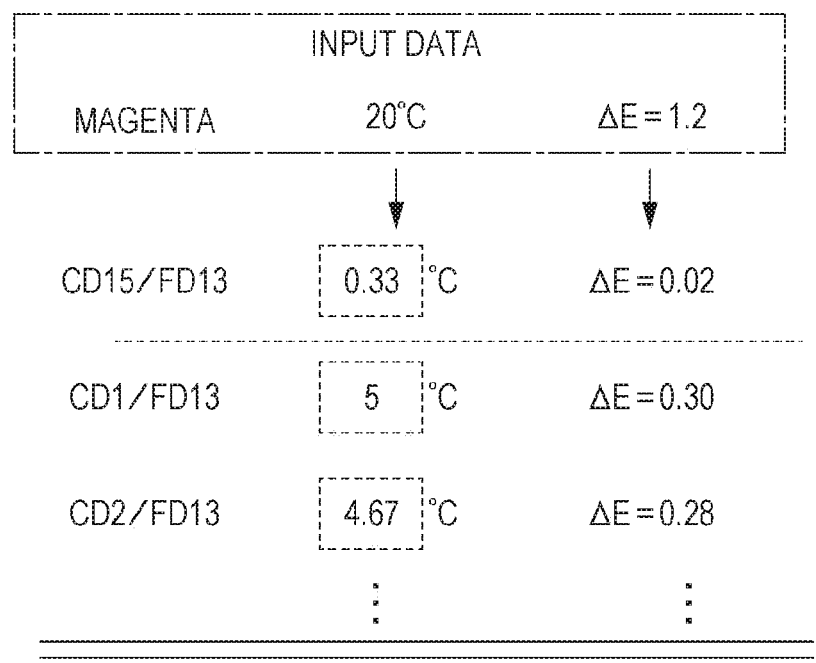
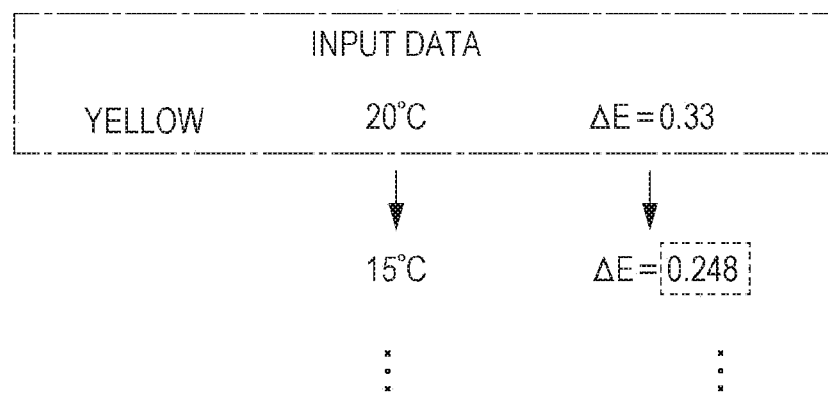

TEMPERATURE CORRECTION PATCH
TEMPERATURE CORRECTION PATCH

TEMPERATURE
CORRECTION PATCH

IMAGE FORMING SYSTEM, IMAGE READING APPARATUS, AND IMAGE FORMING APPARATUS INCLUDING MEANS FOR DETERMINING A TEMPERATURE DISTRIBUTION IN A PAPER MEDIUM

Japanese Patent Application No. 2016-156337 filed on Aug. 9, 2016, including description, claims, drawings, and abstract the entire disclosure is incorporated herein by reference in its entirety.

BACKGROUND

Technological Field

The present invention relates to an image forming system, an image reading apparatus, and an image forming apparatus.

Description of the Related Art

In related art, it has been known that a patch is affected by the thermochromism phenomenon at the time of colorimetry of the patch formed on a paper medium. The thermochromism phenomenon is a phenomenon in which a color of the patch changes by changing a colored object forming the color of the patch according to the temperature. Therefore, in a case where the colorimetry is performed to the patches formed on the paper medium, errors caused by the temperature may be included in the colorimetric result depending on the temperature of the paper medium.

Therefore, a technique has been proposed for correcting the colorimetric value based on the colorimetric value of the patch and the temperature at the time of the colorimetry by referring to a table in which a reference color value is associated with a change amount of the reference color value due to the temperature (for example, refer to JP 2010-088058 A).

Regarding a patch to be printed at a print position on the paper medium, a technique has been proposed for correcting the colorimetric value based on a white paper temperature of the paper medium and a relative temperature value of the patch by previously obtaining the relative temperature value of the patch as having the white paper temperature of the paper medium as a reference (for example, refer to JP 2011-027720 A).

Also, a technique has been proposed for correcting the colorimetric value based on the amount of the applied patches and the estimated temperature when the patch passes the position of the color sensor (for example, refer to JP 2012-514739 A).

In addition, regarding the patch along the traveling direction of the paper medium, a technique has been proposed in which an arrangement of the patch is adjusted to prolong a time from the fixed position to the colorimetric position as the influence of the thermochromism phenomenon increases (for example, refer to JP 2013-080129 A).

However, the scanner reads the patch formed on the paper medium along the direction perpendicular to a traveling direction of the paper medium. Therefore, in a case where a temperature distribution is developed along the perpendicular direction, the reading result of the scanner is affected by the thermochromism phenomenon. Therefore, for accurate reading result of the scanner, it is necessary to correct the reading result of the scanner based on the temperature distribution.

For example, in the related art disclosed in JP 2010-088058 A, to consider the influence of the temperature distribution, it is necessary to provide a temperature sensor for each patch along the perpendicular direction. Therefore, in the related art disclosed in JP 2010-088058 A, cost of the entire system increases.

Also, in the related art disclosed in JP 2011-027720 A, since the relative temperature value of the patch is the temperature of the patch having the white paper temperature of the paper medium as a reference, there are countless numbers of relative temperature values depending on the paper type of the paper medium and the like. Therefore, since there are numerous necessary data, the data cannot be accurately used. In the related art disclosed in JP 2012-514739 A and JP 2013-080129 A, the colorimetric result is not corrected based on the temperature distribution developed along the direction perpendicular to the traveling direction of the paper medium.

Therefore, the related arts disclosed in JP 2010-088058 A, JP 2011-027720 A, JP 2012-514739 A, and JP 2013-080129 A are cannot maintain the accuracy of the temperature distribution at low cost even in a state where the influence of the thermochromism phenomenon is received.

It should be noted that in the related art disclosed in JP 2013-080129 A, the patch which is easily affected by the thermochromism phenomenon is disposed at a rear side in the traveling direction to improve the influence of the thermochromism phenomenon. Therefore, the arrangement of patches is restricted. Therefore, in the related art described above, the arrangement of patches is restricted.

SUMMARY

The present invention has been made to solve the conventional problems, and an object thereof is to provide an image forming system, an image reading apparatus, and an image forming apparatus.

To achieve the abovementioned object, according to an aspect of the present invention, an image forming system reflecting one aspect of the present invention comprises: an image forming apparatus; and an image reading apparatus that reads an image to be formed on a paper medium by the image forming apparatus, wherein on the paper medium, temperature correction patches with the same color are formed at a reference position where a reference temperature is detected and a comparison position different from the reference position as the image, the image reading apparatus includes: a scanner that reads respective colors of the temperature correction patch at the reference position and the temperature correction patch at the comparison position; and a colorimeter that performs colorimetry to the temperature correction patch at the reference position, the image forming apparatus includes: a detector that detects a temperature of the temperature correction patch at the reference position; a first calculator that calculates a color difference between a color value of the temperature correction patch at the reference position and a color value of the temperature correction patch at the comparison position based on the reading result by the scanner and the colorimetric result by the colorimeter; and a second calculator that calculates a temperature distribution occurred in the paper medium based on the temperature of the temperature correction patch detected by the detector and the color difference calculated by the first calculator, and in the temperature distribution occurred in the paper medium, as a temperature difference between a first position and a second position increases, the color difference increases.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram of an example of a color difference and a temperature difference on the paper medium according to the first embodiment of the present invention;

FIG. 7 is a diagram of an exemplary temperature correction patch and color correction patch formed on the paper medium according to the first embodiment of the present invention;

FIG. 9 is a diagram to specifically describe an exemplary calculation according to the first embodiment of the present invention;

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
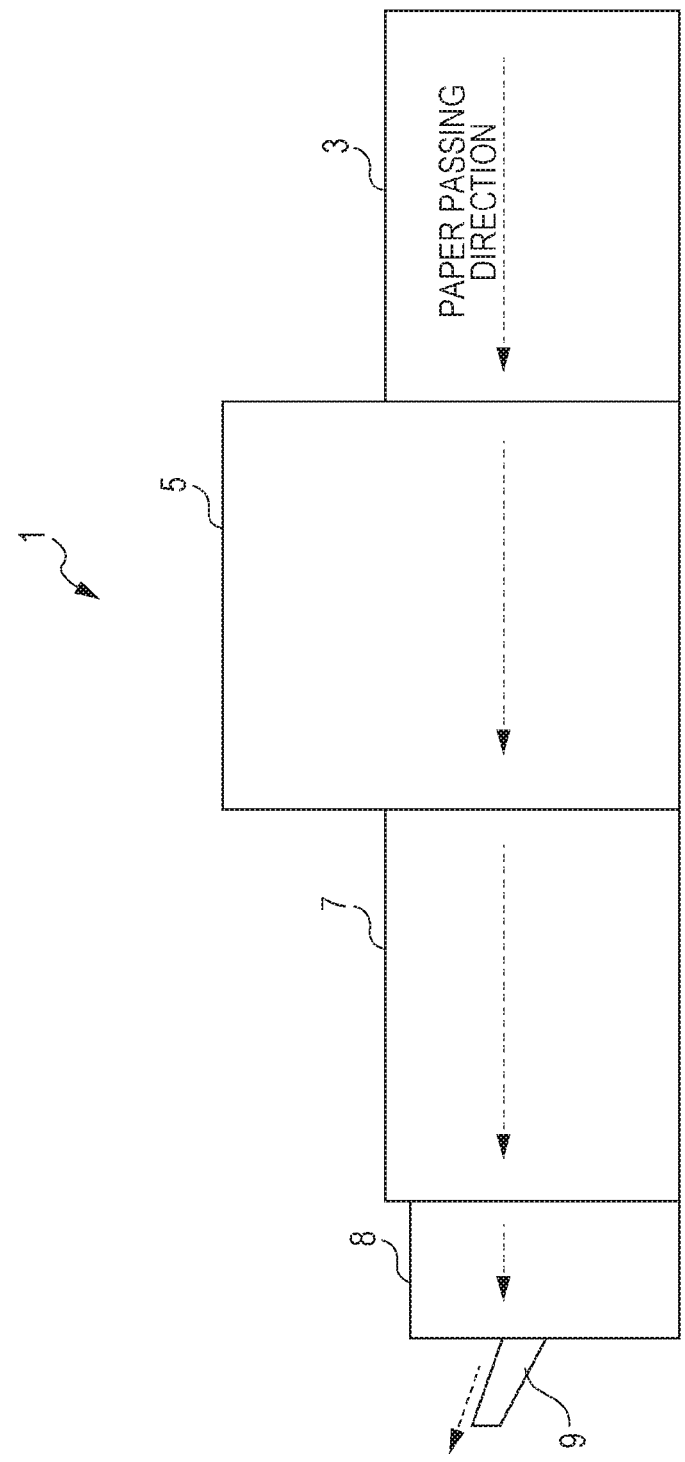
FIG. 1 is a diagram of an exemplary whole structure of an image forming system 1 according to a first embodiment of the present invention.

FIG. 1 is a diagram of an exemplary whole structure of an image forming system 1 according to a first embodiment of the present invention. As illustrated in FIG. 1, the image forming system 1 includes a paper feeding device 3, an image forming apparatus 5, an image reading apparatus 7, and a paper discharging device 8. The paper feeding device 3 feeds a paper medium P to the image forming apparatus 5. The image forming apparatus 5 forms an image on the paper medium P fed from the paper feeding device 3. The image reading apparatus 7 reads the paper medium P on which the image has been formed by the image forming apparatus 5 and performs various processing. The paper discharging device 8 includes a paper discharge tray 9 and discharges the paper medium P conveyed from the image reading apparatus 7 to the paper discharge tray 9.

Figure 2:
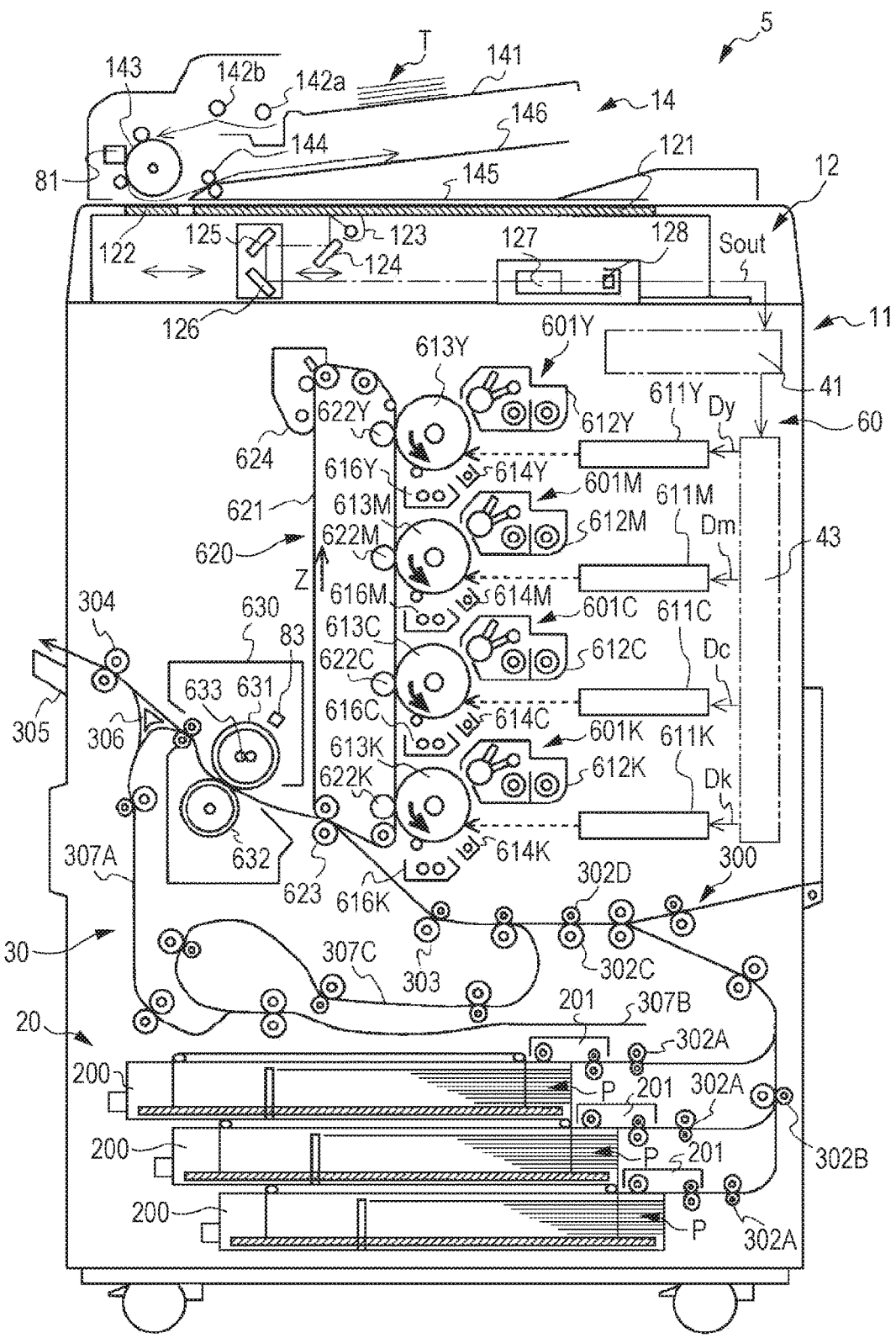
FIG. 2 is a diagram of an exemplary structure of an image forming apparatus according to the first embodiment of the present invention.

FIG. 2 is a diagram of an exemplary structure of the image forming apparatus 5 according to the first embodiment of the present invention. As illustrated in FIG. 2, the image forming apparatus 5 is an exemplary color copying machine. The image forming apparatus 5 obtains image information by reading a color image formed on a document T. The image forming apparatus 5 forms a color image by overlapping colors on the basis of the obtained image information. The image forming apparatus 5 is suitable for application to a color printer, a facsimile machine, or a multifunction machine of the color printer and the facsimile machine, in addition to color copying machine.

The image forming apparatus 5 includes an image forming apparatus main body 11. A color image reading unit 12 and an automatic document feeder 14 are disposed on the upper part of the image forming apparatus main body 11. Although details will be described later, the image forming apparatus main body 11 includes a control unit 41, an image processor 43, an image forming part 60, a paper feeding unit 20, and a conveying unit 30.

The automatic document feeder 14 is provided on the image reading unit 12 and performs an operation for automatically feeding one or a plurality of documents T at the time of an automatic paper feeding mode. The automatic paper feeding mode is an operation for feeding the document T placed on the automatic document feeder 14 and reading an image printed on the document T.

More specifically, the automatic document feeder 14 includes a document holding unit 141, rollers 142a, 142b, 143, and 144, a reversing unit 145, and a paper discharge plate 146. One or the plurality of documents T is placed on the document holding unit 141. The rollers 142a and 142b are provided on the downstream side of the document holding unit 141. The roller 143 is provided on the downstream side of the rollers 142a and 142b. Also, the automatic document feeder 14 includes a positioning detector 81 on the outer peripheral side of the roller 143.

In a case where the automatic paper feeding mode has been selected, the document T fed from the document holding unit 141 is rotated in a U shape and conveyed by the roller 143. In a case where the document T is placed on the document holding unit 141 and the automatic paper feeding mode is selected, it is preferable that a recording surface of the document T faces upward.

Further, after the image reading unit 12 has read the document T, the document T is conveyed by the roller 144 and discharged to the paper discharge plate 146. By conveying the document T to the reversing unit 145, the automatic document feeder 14 can make the image reading unit 12 read not only the recording surface of the document T but also the back side of the recording surface of the document T.

The positioning detector 81 detects the document T on which the image has been printed. The positioning detector 81 is realized by, for example, a reflective photosensor. In the positioning detector 81, when the document T is detected, an output detection signal rises, and when the document T is no longer detected, the output detection signal falls, and the result is transmitted to the control unit 41. That is, the output signal maintains a constant value in a period when the document T passes through the positioning detector 81.

The image reading unit 12 reads a color image formed on the document T, that is, a color image printed on the document T. The image reading unit 12 includes a one-dimensional image sensor 128. In addition to the image sensor 128, the image reading unit 12 includes a first platen glass 121, a second platen glass 122, a light source 123, mirrors 124 to 126, an imaging optical unit 127, and an optical drive unit which is not shown.

The light source 123 irradiates the document T with light. The optical drive unit which is not shown relatively moves the document T or the image sensor 128 in a sub-scanning direction. The arrangement direction of a plurality of light receiving elements included in the image sensor 128 is the main scanning direction. The sub-scanning direction is a direction perpendicular to the main scanning direction.

The document T is conveyed by the automatic document feeder 14, and an image on one side or both sides of the document T is scanned and exposed by an optical system of the image reading unit 12. The incident light reflecting the image reading operation is read by the image sensor 128. In a platen mode, the image sensor 128 outputs an image reading signal Sout of the RGB color system obtained by reading the document T. The platen mode is an operation mode for automatically reading an image printed on the document T placed on the first platen glass 121 by driving the optical drive unit which is not shown.

As the image sensor 128, a three-line color CCD imaging device is used. The image sensor 128 is formed by arranging the plurality of light receiving element arrays in the main scanning direction. Specifically, reading sensors for light detection of red (R), green (G), and blue (B) respectively divide pixels at different positions in the sub-scanning direction perpendicular to the main scanning direction and concurrently read respective optical information of colors of R, G, and B. For example, in a case where the mode is the automatic paper feeding mode and the document T is reversed in the U shape by the roller 143, the image sensor 128 reads the surface of the document T and outputs the image reading signal Sout.

More specifically, the image sensor 128 photoelectrically converts the incident light. The image sensor 128 is connected to the image processor 43 via the control unit 41. The analog image reading signal Sout photoelectrically converted by the image sensor 128 is output to the image processor 43 via the control unit 41. The image processor 43 executes signal processing to the image reading signal Sout.

The image processor 43 includes an operation unit such as a CPU or an integrated circuit such as an ASIC. The image processor 43 functions as a processor for performing various execution processing. For example, the image processor 43 executes analog processing, A/D conversion processing, shading correction processing, image compression processing, scaling processing, and the like to the image reading signal Sout. Further, as described below with reference to FIG. 4, the image processor 43 generates a temperature distribution occurring on the paper medium P based on various information transferred from the image reading apparatus 7, and various execution processing for correcting the influence of the thermochromism phenomenon based on the temperature distribution is performed.

Based on a three-dimensional color information conversion table, the image processor 43 converts the image reading signal Sout from digital image data (R, G, and B) including R, G, and B components into yellow (Y), magenta (M), cyan (C), and black (K) image data (Dy, Dm, Dc, and Dk). The image processor 43 transfers the image data (Dy, Dm, Dc, and Dk) to the LED writing units 611Y, 611M, 611C, and 611K included in the image forming part 60.

The image forming part 60 utilizes an electrophotographic process technology. The image forming part 60 forms a color image of an intermediate transfer system. Note that a vertical tandem system is employed to the image forming part 60. Specifically, the image forming part 60 forms a color image based on the image data (Dy, Dm, Dc, and Dk) transferred from the image processor 43. The image forming part 60 includes image forming units 601Y, 601M, 601C, and 601K for respective colors, an intermediate transfer unit 620, and a fixing unit 630.

The image forming unit 601Y forms a yellow (Y) image. The image forming unit 601Y includes a photoreceptor drum 613Y, a charging unit 614Y, an LED writing unit 611Y, a developing unit 612Y, and a cleaning unit 616Y.

The photoreceptor drum 613Y forms a yellow (Y) toner image. The charging unit 614Y is disposed around the photoreceptor drum 613Y and uniformly charges the surface of the photoreceptor drum 613Y to have the negative polarity by corona discharge. The LED writing unit 611Y irradiates the photoreceptor drum 613Y with light corresponding to the image of the Y component. The developing unit 612Y visualizes an electrostatic latent image by attaching toner of Y color component to the surface of the photoreceptor drum 613Y to form a toner image. The cleaning unit 616Y removes the transfer residual toner remaining on the surface of the photoreceptor drum 613Y after primary transfer.

Each of the image forming units 601M, 601C, and 601K has the structure and functions similar to those of the image forming unit 601Y, except for the color of the image to be formed. Therefore, the description of the image forming units is omitted.

The image forming units 601Y, 601M, 601C, and 601K are collectively referred to as an image forming unit 601. The LED writing units 611Y, 611M, 611C, and 611K are collectively referred to as an LED writing unit 611.

The intermediate transfer unit 620 includes an intermediate transfer belt 621, primary transfer rollers 622Y, 622M, 622C, and 622K, a secondary transfer roller 623, a belt cleaning device 624, and the like.

The intermediate transfer belt 621 is configured of an endless belt and is stretched by a plurality of support rollers in a loop shape. At least one of the plurality of support rollers is configured of a driving roller, and the support rollers other than the driving roller are configured of driven rollers. For example, it is preferable that the support roller, which is disposed on the downstream side in a belt traveling direction of the primary transfer roller 622K for the K component, be the driving roller. The intermediate transfer belt 621 travels in a direction of an arrow Z at a regular speed by rotating the driving roller.

The primary transfer rollers 622Y, 622M, 622C, and 622K are disposed on an inner surface side of the intermediate transfer belt 621 to be opposed to the photoreceptor drums 613 of the respective color components. The primary transfer rollers 622Y, 622M, 622C, and 622K are respectively brought into pressure contact with the photoreceptor drums 613Y, 613M, 613C, and 613K having the intermediate transfer belt 621 therebetween. As a result, a primary transfer nip to transfer the toner image from the photoreceptor drums 613Y, 613M, 613C, and 613K to the intermediate transfer belt 621 is formed.

The primary transfer rollers 622Y, 622M, 622C, and 622K are collectively referred to as a primary transfer roller 622.

The secondary transfer roller 623 is disposed on the outer peripheral surface side of the intermediate transfer belt 621 to be opposed to one of the plurality of support rollers. The support roller disposed to be opposed to the intermediate transfer belt 621 is referred to as a backup roller. A secondary transfer nip is formed to transfer the toner image from the intermediate transfer belt 621 to the paper medium P by pressing the secondary transfer roller 623 against the backup roller as sandwiching the intermediate transfer belt 621.

When the intermediate transfer belt 621 passes through the primary transfer nip, the toner images on the photoreceptor drums 613 are sequentially overlapped with each other and primarily transferred on the intermediate transfer belt 621. Specifically, a primary transfer bias is applied to the primary transfer roller 622, and a charge with the opposite polarity to the toner is applied on a rear surface side of the intermediate transfer belt 621, that is, a side having contact with the primary transfer roller 622. According to this, the toner image is electrostatically transferred on the intermediate transfer belt 621.

When the toner image is electrostatically transferred on the intermediate transfer belt 621 and the paper medium P passes through the secondary transfer nip, the toner image on the intermediate transfer belt 621 is secondarily transferred on the paper medium P. Specifically, a secondary transfer bias is applied to the secondary transfer roller 623, and a charge with the opposite polarity to the toner is applied on a rear surface side of the paper medium P, that is, a side having contact with the secondary transfer roller 623. According to this, the toner image is electrostatically transferred on the paper medium P. The paper medium P on which the toner image has been transferred is conveyed toward the fixing unit 630.

The belt cleaning device 624 includes a belt cleaning blade or the like that is in sliding contact with the surface of the intermediate transfer belt 621. The belt cleaning device 624 removes the transfer residual toner remaining on the surface of the intermediate transfer belt 621 after the secondary transfer.

In the intermediate transfer unit 620, a structure in which a secondary transfer belt which is not shown is stretched in a loop shape by the plurality of support rollers including the secondary transfer roller 623, that is, a belt-type secondary transfer unit may be employed instead of the secondary transfer roller 623.

The fixing unit 630 includes a heating roller 631, a pressure roller 632, a heating unit 633, and a temperature detector 83, and fixes the toner image transferred by the image forming part 60 on the paper medium P.

The heating unit 633 is provided in the heating roller 631 and intermittently heats the heating roller 631. The pressure roller 632 is disposed to be opposed to the heating roller 631 and applies the pressure on the heating roller 631. The temperature detector 83 is provided around the heating roller 631 and detects the temperature of the heating roller 631. A sampling period of the temperature detector 83 is, for example, 100 ms.

In the fixing unit 630, the heating unit 633 heats the heating roller 631 according to the detection result of the temperature detector 83 for detecting the temperature of the heating roller 631. The fixing unit 630 forms a fixing nip between the heating roller 631 and the pressure roller 632 by bringing the heating roller 631 and the pressure roller 632 into pressure contact with each other.

The fixing unit 630 fixes the transferred toner image on the paper medium P through the action of the pressure by the pressure roller 632 and the heat of the heating roller 631. An image is printed on the paper medium P on which the toner image has been fixed by the fixing unit 630. The paper medium P on which the image has been printed is discharged outside the apparatus by a paper discharge roller 304, and is conveyed to, for example, the image reading apparatus 7. Note that the paper medium P on which the image has been printed may be stacked on the paper discharge tray 305 without being conveyed to the image reading apparatus 7.

The paper feeding unit 20 includes paper feeding cassettes 200, feeding rollers 201, and the like. The paper feeding cassette 200 stores the paper medium P. The feeding roller 201 takes in the paper medium P stored in the paper feeding cassette 200 and feeds the paper medium P to the conveying unit 30.

A conveying path 300 is formed in the conveying unit 30, and the paper medium P is conveyed along the conveying path 300. The conveying path 300 includes a paper feeding roller 302A, conveying rollers 302B, 302C, and 302D, a resist roller 303, and the like.

The conveying path 300 conveys the paper medium P fed from the paper feeding unit 20 to the image forming part 60. In a case where an image is also formed on the back surface of the paper medium P, the paper medium P is sequentially conveyed to a circulating paper passage 307A, a reverse conveyance path 307B, and a re-feed conveyance path 307C by a branch part 306 after the image has been formed on the surface of the paper medium P.

Specifically, the control unit 41 mainly includes a CPU, a ROM, a RAM, and an I/O interface which are not shown. The CPU reads various programs according to the processing contents from the ROM or a storage unit which is not shown, develops the programs in the RAM, and cooperates with the developed programs so that the control unit 41 controls operations of the units in the image forming apparatus 5 and realizes various functions as a processor for performing the various execution processes.

Figure 3:
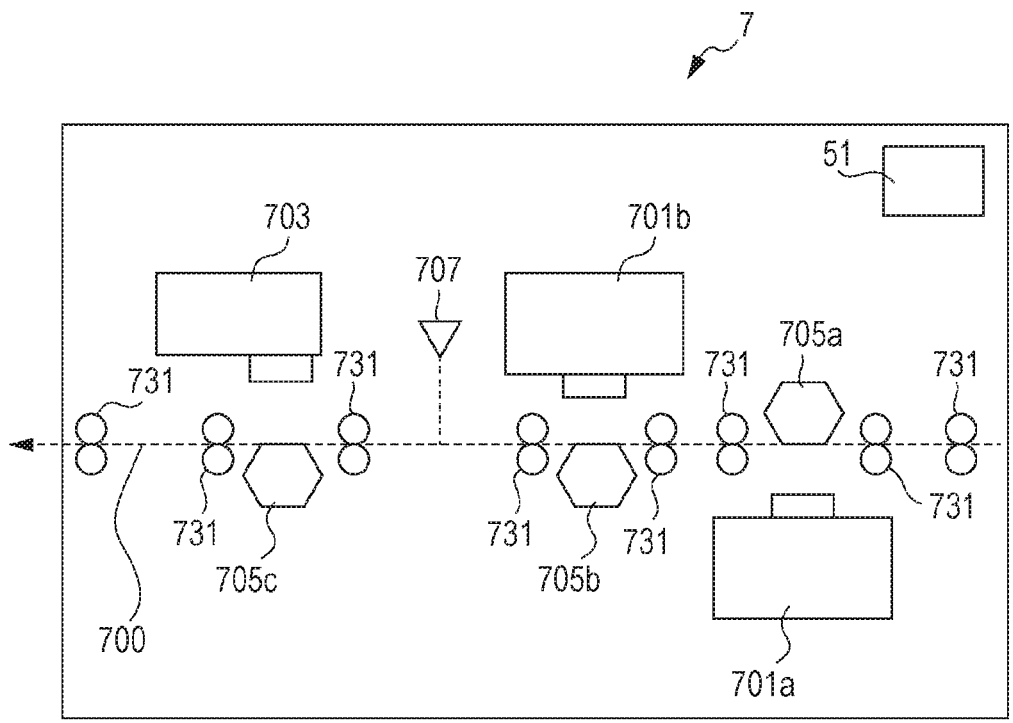
FIG. 3 is a diagram of an exemplary structure of an image reading apparatus according to the first embodiment of the present invention.

FIG. 3 is a diagram of an exemplary structure of the image reading apparatus 7 according to the first embodiment of the present invention. The image reading apparatus 7 is operated in the in-line system or the off-line system. The in-line system is configured to directly feed the paper medium P, on which the image has been formed, supplied from the image forming apparatus 5 to the image reading apparatus 7. On the other hand, the off-line system is configured to directly feed the paper medium P, on which the image has been formed, supplied from the image forming apparatus 5 to the image reading apparatus 7. In the off-line system, the image forming apparatus 5 and the image reading apparatus 7 are independently formed. In the present embodiment, the in-line system is used as a premise. However, the off-line system may be used.

As illustrated in FIG. 3, the image reading apparatus 7 is disposed on the downstream side of the image forming apparatus 5 and reads an image printed on one side or both sides of the paper medium P. Specifically, the image reading apparatus 7 obtains a correction amount of the image based on the reading result such as the color, the position, the magnification, and the like of the image printed on the paper medium P and feeds back the obtained correction amount of the image to the image forming apparatus 5.

The image reading apparatus 7 includes a control unit 51, scanners 701a and 701b, a colorimeter 703, calibration units 705a to 705c, a conveying roller 731, and a conveying path 700. The conveying path 700 is a path where the paper medium P supplied from the image forming apparatus 5 passes through. In the conveying path 700, the paper medium P is conveyed by driving the conveying roller 731.

The image reading apparatus 7 includes a detector 707. The detector 707 is disposed between the scanner 701b and the colorimeter 703 and detects a temperature of a patch formed on the paper medium P passing through the conveying path 700. The detector 707 is a temperature sensor for detecting the temperature of the paper medium P without contact. The detector 707 is realized by, for example, a thermopile sensor.

For example, upon receiving the paper medium P supplied from the image forming apparatus 5, the image reading apparatus 7 causes the scanners 701a and 701b, and the colorimeter 703 to detect the image formed on the paper medium P. The detection result of the image is output to the control unit 51 of the image reading apparatus 7.

More specifically, the scanners 701a and 701b are disposed in a positional relation to be opposed to the paper medium P passing through the conveying path 700. The scanners 701a and 701b read the image printed on the paper medium P.

The scanner 701a reads the back side of the paper medium P. The reading result of the scanner 701a is used, for example, to check whether the front and back of the image printed on the paper medium P are misaligned, or to check whether an unexpected image is printed. On the other hand, the scanner 701b reads the surface of the paper medium P. The scanner 701b reads the image printed on the paper medium P, for example, a patch. As the paper medium P is conveyed, the scanner 701b reads the color of the patch formed on the paper medium P along the direction perpendicular to the traveling direction of the paper medium P.

The scanners 701a and 701b are collectively referred to as a scanner 701. The calibration units 705a to 705c are collectively referred to as a calibration unit 705.

The colorimeter 703 is disposed on the downstream side of the scanner 701 and at a position to be opposed to the paper medium P passing through the conveying path 700. The colorimeter 703 guarantees an absolute value of the color of the image to be formed on the paper medium P by measuring the color of the patch formed on the paper medium P, for example.

Specifically, the colorimeter 703 emits visible light toward the patch from a visible light source which is not shown. The colorimeter 703 obtains a spectral spectrum of the reflected light of the visible light reflected by the calibration unit 705c. The colorimeter 703 obtains a tristimulus value (X, Y, Z) based on the spectroscopic data obtained from the obtained spectral spectrum. The colorimeter 703 obtains a color value based on the tristimulus value (X, Y, Z). Specifically, the color value is represented by a color system such as an orthogonal coordinate system or a cylindrical coordinate system, and the color tone of the patch is derived. The color value is output to the control units 51, the control unit 41, or the image processor 43.

Note that the colorimetric range of the colorimeter 703, that is, the viewing angle is set to be narrower than the reading range of the scanner 701 and narrower than the width of the patch along the width direction of the paper medium. Specifically, a lens part for obtaining the reflected light of the patch, for example, has a width of about four mm.

In this way, since the colorimeter 703 performs colorimetry while limiting a range to a certain range of a viewing angle, the color value can be reproduced with higher accuracy than the scanner 701.

The control unit 51 corrects the read value of the color of the patch read by the scanner 701 based on the color value of the patch obtained by the colorimeter 703. Specifically, the image processor 43 associates the color value of the patch obtained by the colorimeter 703 with the read value of the color of the patch read by the scanner 701. If the color value of the patch obtained by the colorimeter 703 and the read value of the color of the patch read by the scanner 701 are associated with each other, the colorimetric result of the colorimeter 703 can be reflected on the reading result of the scanner 701. Therefore, an accurate correction amount of the patch can be obtained.

Note that the read value of the color of the patch read by the scanner 701 can be indicated by image data (R, G, and B) represented by the RGB color system, for example. Also, the color value of the patch obtained by the colorimeter 703 can be represented by colorimetric values (L*, a*, b*) represented by the CIELAB color space, for example. Therefore, the image data (R, G, and B) represented by the RGB color system can be associated with the colorimetric values (L*, a*, b*) represented by the CIELAB color space.

The image processor 43 optimizes the image to be formed by the image forming part 60 based on the correction amount calculated by the image processor 43. The image optimization processing executed by the image processor 43 includes front and back position adjustment, density adjustment, color adjustment, and the like of the image printed on the paper medium P.

That is, the image processor 43 corrects the color, the position, or the magnification of the image to be formed on the paper medium P according to the reading result of the paper medium P of the image reading apparatus 7. Specifically, the image processor 43 corrects the image to be formed on the paper medium P based on the corrected color value of the patch. The image processor 43 transfers an instruction to form the image on the paper medium P to the image forming part 60 based on the correction result.

The calibration unit 705a is disposed at a position to be opposed to the scanner 701a. The calibration unit 705b is disposed at a position to be opposed to the scanner 701b. The calibration units 705a and 705b reflect the irradiation light irradiated on the paper medium P at the time of reading the image.

Specifically, the control unit 51 mainly includes a CPU, a ROM, a RAM, and an I/O interface which are not shown. The CPU reads various programs according to the processing contents from the ROM or a storage unit which is not shown, develops the programs in the RAM, and cooperates with the developed programs so that the control unit 51 controls operations of the units in the image reading apparatus 7 and realizes various functions as a processor for performing the various execution processes.

Figure 4:
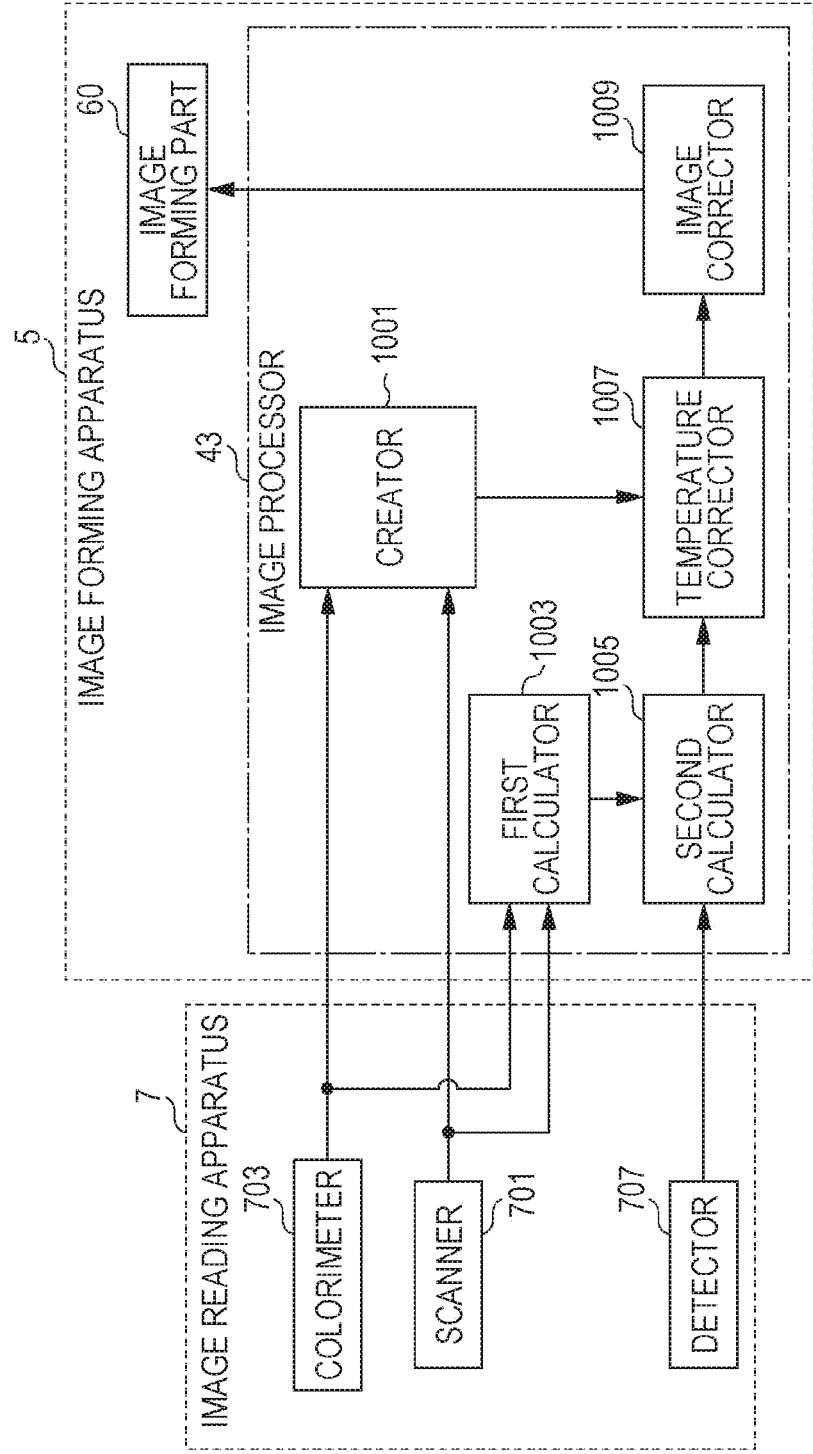
FIG. 4 is a diagram of an exemplary functional configuration of the image forming system according to the first embodiment of the present invention.
Figure 5:
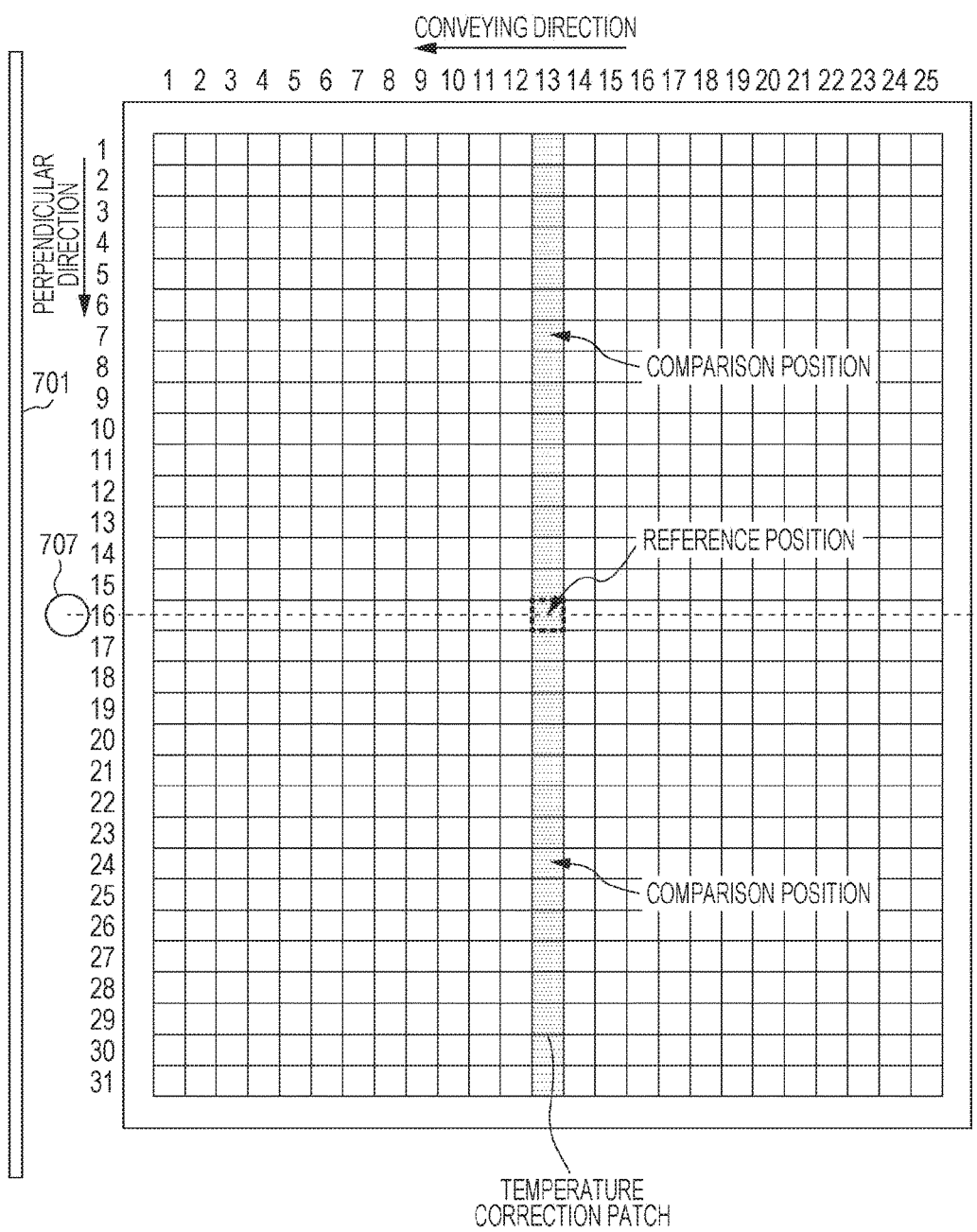
FIG. 5 is a diagram of an exemplary temperature correction patch formed on a paper medium according to the first embodiment of the present invention.

FIG. 4 is a diagram of an exemplary functional configuration of the image forming system 1 according to the first embodiment of the present invention. FIG. 5 is a diagram of an exemplary temperature correction patch formed on the paper medium P according to the first embodiment of the present invention. FIG. 6 is a diagram of an example of a color difference ΔE and a temperature difference on the paper medium P according to the first embodiment of the present invention.

As illustrated in FIG. 4, the image processor 43 includes a creator 1001, a first calculator 1003, a second calculator 1005, a temperature corrector 1007, and an image corrector 1009 and performs an execution process as a processor.

As illustrated in FIG. 5, temperature correction patches having the same color are formed on the paper medium P as an image at a reference position where a reference temperature is detected and at a comparison position different from the reference position. In one example of FIG. 5, at a dot meshed position, temperature correction patches with the same magenta color are formed adjacent to each other along the direction perpendicular to the traveling direction of the paper medium P.

That is, the temperature correction patches are formed so that the reference position and the comparison position are opposed to each other, and the plurality of temperature correction patches is formed at each of the comparison positions along at least one of the traveling direction of the paper medium P and the direction perpendicular to the traveling direction of the paper medium P.

In the following description, the traveling direction of the paper medium P is named as an FD direction, and the direction perpendicular to the traveling direction of the paper medium P is named as a CD direction. The positions of the temperature correction patches that can be formed along the FD direction are named in ascending order from the top of the paper medium P. The positions of the temperature correction patches that can be formed along the CD direction are named in ascending order from the head position in the FD direction of the paper medium P. By using these names, for example, a coordinate of the temperature correction patch is referred to as CD (16)/FD (13). The position of CD (16)/FD (13) is a position corresponding to the reference position.

The scanner 701 reads the respective colors of the temperature correction patch at the reference position and the temperature correction patches at the comparison positions. The colorimeter 703 performs the colorimetry to the temperature correction patch at the reference position. The detector 707 is disposed in the row of CD (16) and detects the temperature of the temperature correction patch at the reference position.

In a case where the detector 707 detects a temperature change such as a change from a normal state to a high temperature state, the detection result is output after a time lag occurs, depending on the responsiveness of the detection. In this case, the temperature of the paper medium P in the FD direction is correctly detected from the middle of the paper medium P. Therefore, with the high responsiveness and high performance, the detection result is output without occurrence of the time lag. In a case where the detector 707 has such a high performance, the detection resolution in the FD direction becomes high. Therefore, the detection for each FD column can be performed.

In the example in FIG. 5, it is assumed that the detector 707 be a thermopile sensor having responsiveness that can detect from the column of FD (10) and the following. Therefore, a magenta temperature correction patch is formed in the column of FD (13) on the downstream side of the column of FD (10). In the FD direction, it is assumed that the temperature of the paper medium P be uniformly the same.

As illustrated in FIG. 6, the temperature of the temperature correction patch at CD (16)/FD (13), which is the reference position detected by the detector 707, is 40° C., for example. In the row of CD (16), it is assumed that there be no temperature difference in the CD direction. Therefore, since the temperatures of the temperature correction patches in the CD column are the same, it is assumed that all the temperatures of the temperature correction patches in the row of CD (16) be 40° C.

Based on the reading result of the scanner 701 and the colorimetric result of the colorimeter 703, the first calculator 1003 obtains a color difference ΔE between the color value of the temperature correction patch at the reference position and the color value of the temperature correction patch at the comparison position. The second calculator 1005 obtains a temperature distribution occurred in the paper medium P based on the temperature of the temperature correction patch detected by the detector 707 and the color difference ΔE obtained by the first calculator 1003.

Specifically, regarding the magenta in the column of FD (13), a color value with which L* is 53.367, a* is 104.921 and b* is −70.387 is calculated in CD coordinates (1) to (31) based on the reading result of the column FD (13) by the scanner 701 and the colorimetric result of the CD (16)/FD (13) by the colorimeter 703. The detector 707 detects 40° C. as the temperature of CD (16)/FD (13) as the reference temperature. Therefore, when the color difference ΔE of CD (16)/FD (13) is taken as a reference, the color difference ΔE of 0.02 is generated from CD (15) toward CD (1) or from CD (17) toward CD (31).

As described above, despite the colorimetry has been performed regarding the same color, the color difference ΔE is generated. It is assumed that the difference is caused by the influence of the thermochromism phenomenon. Therefore, the color difference ΔE is converted into the temperature difference, and the color value under the influence of the thermochromism phenomenon is corrected. First, regarding magenta, a calculation based on input data that the reference color difference ΔE' corresponding to a temperature difference of 20° C. becomes 1.2 is performed. As described above, the color difference ΔE of the color values of the columns adjacent to each other in the CD column occurs by 0.02 at a time. Therefore, when the color difference ΔE is 0.02, 20×(0.02/1.2)=about 0.33 is satisfied. Therefore, the temperature difference is −0.33° C.

Also, since the color difference ΔE occurs by 0.02 at a time, the color difference ΔE between the color value of CD (16)/FD (13) at the reference position and the color value of CD (1)/FD (13) is 0.30. Therefore, when the color difference ΔE is 0.30, 20×(0.30/1.2)=5 is satisfied. Therefore, the temperature difference between the temperature of the temperature correction patch of CD (1)/FD (13) and the temperature of the temperature correction patch of CD (16)/FD (13) is −5° C. That is, the temperature of the temperature correction patch in CD (1)/FD (13) is estimated to be 40−5=35° C.

Similarly, the color difference ΔE between the color value of CD (16)/FD (13) at the reference position and the color value of CD (2)/FD (13) is 0.28. Therefore, when the color difference ΔE is 0.28, 20×(0.28/1.2)=about 4.67 is satisfied. The temperature difference between the temperature of the temperature correction patch of CD (2)/FD (13) and the temperature of the temperature correction patch CD (16)/FD (13) is −4.67° C. That is, the temperature of the temperature correction patch in CD (2)/FD (13) is estimated to be 40−4.67=35.33° C.

By similarly calculating the temperatures of the temperature correction patches of CD (3)/FD (13) to CD (15)/FD (13) and CD (17)/FD (13) to CD (31)/FD (13), the temperatures of the temperature correction patches in all the columns can be estimated. In this way, as illustrated in FIG. 6, since the temperature of the temperature correction patch of each CD column can be estimated, the temperature distribution occurred in the paper medium P can be obtained. Based on the above description, as the temperature difference between the first position and the second position increases, the color difference ΔE increases in the temperature distribution occurred in the paper medium P.

Next, processing for performing thermochromism correction on the colorimetric values of the color correction patches formed on the paper medium P is described. FIG. 7 is a diagram of an exemplary temperature correction patch and color correction patch formed on the paper medium P according to the first embodiment of the present invention. On the paper medium P, as an image, color correction patches with respective different colors are formed in an entire image formable range, in addition to the same color temperature correction patch. The image formable range is a range where the image forming part 60 can form an image on the paper medium P. In FIG. 7, it is assumed that the temperature correction patch be formed at a dot meshed position and that the color correction patch is formed at a position indicated by hatching. It is assumed that the colorimeter 703 perform the colorimetry to the color correction patches in a specific column of the color correction patches.

It is assumed that a correction reference temperature used for color expression be 20° C. Based on the temperature distribution obtained by the second calculator 1005, the temperature corrector 1007 obtains a correction temperature difference between the correction reference temperature and the temperature of the color correction patch. Specifically, it is assumed that the color correction patch in CD (1)/FD (23) be yellow. As described above, the temperature of magenta of the row of CD (1) is assumed to be 35° C. based on the temperature distribution. Since the correction reference temperature is 20° C., the correction temperature difference is 15° C. The correction temperature difference is corrected according to the influence of the thermochromism phenomenon for each color.

Based on the correction temperature difference obtained by the temperature corrector 1007 and the reference color difference ΔE' of the colorimetry target color corresponding to the correction reference temperature, the image corrector 1009 corrects reading result of the color correction patch over the entire image formable range by the scanner 701.

Specifically, in the case of yellow, a calculation based on the input data that the reference color difference ΔE' corresponding to the temperature difference of 20° C. becomes 0.33 is performed. As described above, the correction temperature difference is 15° C. Therefore, when the correction temperature difference is 15° C., the color difference ΔE is 0.33×(15/20)=0.2475. Therefore, the color difference ΔE is about 0.248. Therefore, it is preferable that the color difference ΔE=0.248 be corrected to the colorimetric value of the color correction patch in CD (1)/FD (23) to be used. By repeating such an operation for each color correction patch at each coordinate, the thermochromism correction of the color correction patch can be executed. It is preferable to perform the above calculation on each paper medium P.

In short, the creator 1001 creates related information that associates the colorimetric result of the color correction patch of a specific column by the colorimeter 703 with the reading result of the color correction patch over the entire image formable range of the scanner 701. The image forming part 60 forms the color of the image based on the reading result of the color correction patch corrected by the image corrector 1009 and the related information created by the creator 1001.

A color having a greater degree of the influence of the thermochromism phenomenon than the color correction patch is allocated to the temperature correction patch.

Figure 8:
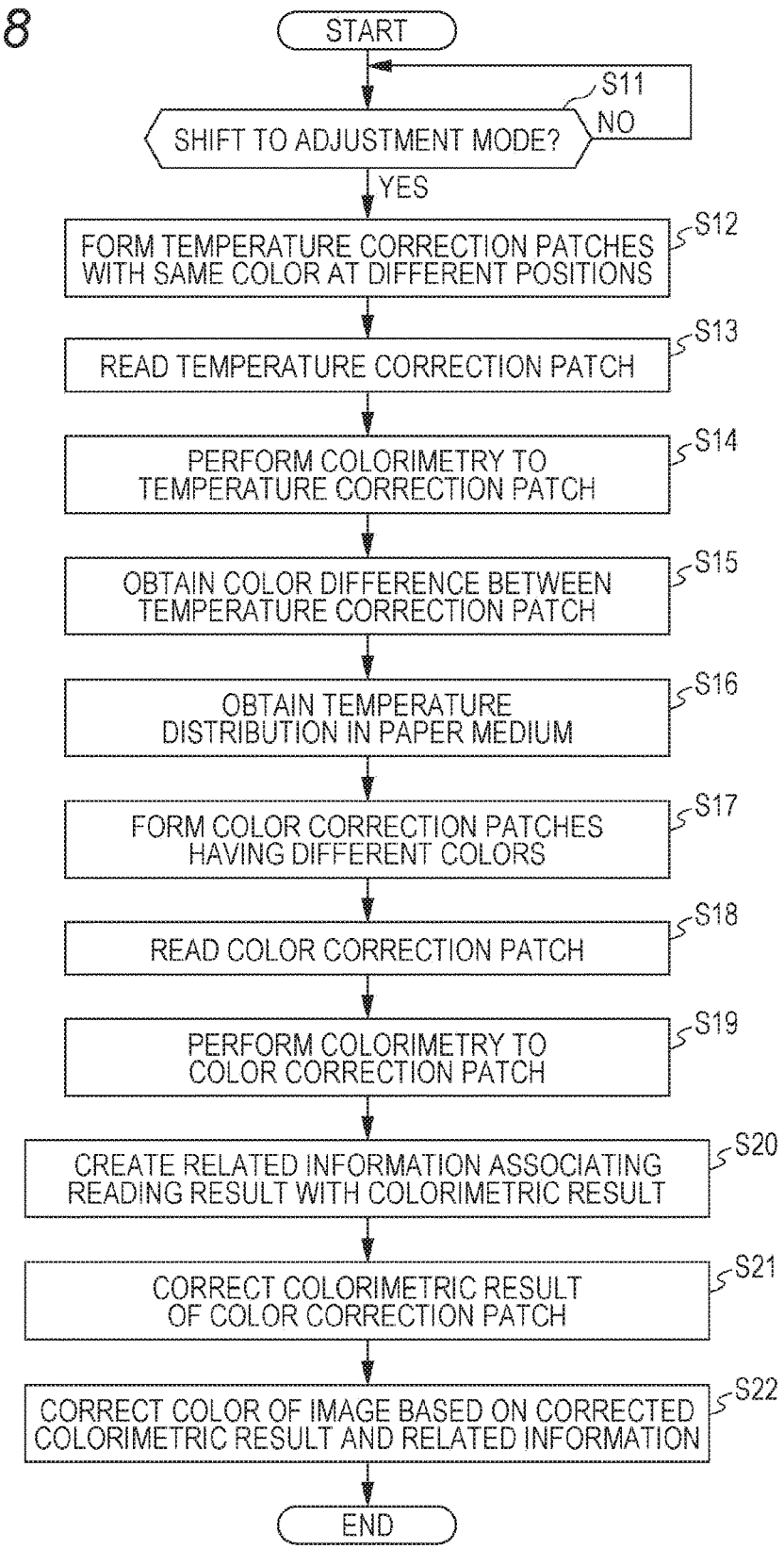
FIG. 8 is a flowchart to describe an example of control according to the first embodiment of the present invention.

FIG. 8 is a flowchart to describe an example of control according to the first embodiment of the present invention. FIG. 9 is a diagram to specifically describe an exemplary calculation according to the first embodiment of the present invention.

It is determined in step S11 whether the mode is shifted to an adjustment mode. When it is determined that the mode is shifted to the adjustment mode, the procedure proceeds to step S12. On the other hand, in a case where it is determined that the mode is not shifted to the adjustment mode, the procedure remains in step S11. The adjustment mode is a mode for adjusting the image to be formed on the paper medium P, and it is preferable that the adjustment mode be executed at the time of starting the image forming apparatus 5 or after performing a certain number of printing as a trigger.

In step S12, the temperature correction patches having the same color are formed at different positions. In step S13, the scanner 701 reads the temperature correction patch, and the image data (R, G, and B) which is the reading value of the temperature correction patch is generated. In step S14, the colorimeter 703 performs the colorimetry to the temperature correction patch, and the colorimetric values (L*, a*, b*) are calculated as the color value of the temperature correction patch.

In step S15, based on the reading result by the scanner 701 and the colorimetric result by the colorimeter 703, the color difference ΔE of the temperature correction patch having the temperature correction patch positioned at the CD (16)/FD (13) of the reference position as a reference is obtained, in each of the CD coordinates (1) to (15) and the CD coordinates (17) to (31).

In step S16, the temperature distribution occurred in the paper medium P is obtained by converting the color difference ΔE of the temperature correction patch into the temperature difference. For example, as illustrated in FIG. 9, regarding magenta, the temperature difference 0.33° C. corresponding to the color difference ΔE of the temperature correction patch of 0.02 is calculated by using the input data such that the reference color difference ΔE' corresponding to the temperature difference of 20° C. is 1.2. Similarly, as described above, it is preferable that color differences ΔE of the other temperature correction patches be respectively converted into temperature differences. That is, in the processing in steps S12 to S16, the temperature distribution occurred in the paper medium P is obtained by converting the color difference ΔE in the temperature correction patch into the temperature difference.

In step S17, the color correction patches of different colors are formed. In step S18, the scanner 701 reads the color correction patches, and the image data (R, G, and B) which is the read value of the color correction patch is generated. In step S19, the colorimeter 703 performs the colorimetry to the color correction patch, and the colorimetric values (L*, a*, b*) are calculated as the color values of the color correction patch.

In step S20, the related information for associating the reading result by the scanner 701 with the colorimetric result by the colorimeter 703 is created. Since the correlation between the image data (R, G, and B) and the colorimetric values (L*, a*, b*) is formed based on the related information, a color tone (a*, b*) of the color correction patch corresponding to a position, to which the colorimeter 703 does not perform the colorimetry, is complemented. A color profile for color conversion is created by converting the image data (R, G, and B) into the color values represented by the colorimetric values (L*, a*, b*) based on the complementation result.

In step S21, the colorimetric result of the color correction patch is corrected. Although the temperature difference is converted from the color difference ΔE by using the temperature correction patch described above, the color difference ΔE is converted from the temperature difference by using the color correction patch.

In step S22, the color of the image is corrected based on the corrected colorimetry result and the related information, and the procedure is terminated.

Figure 15:
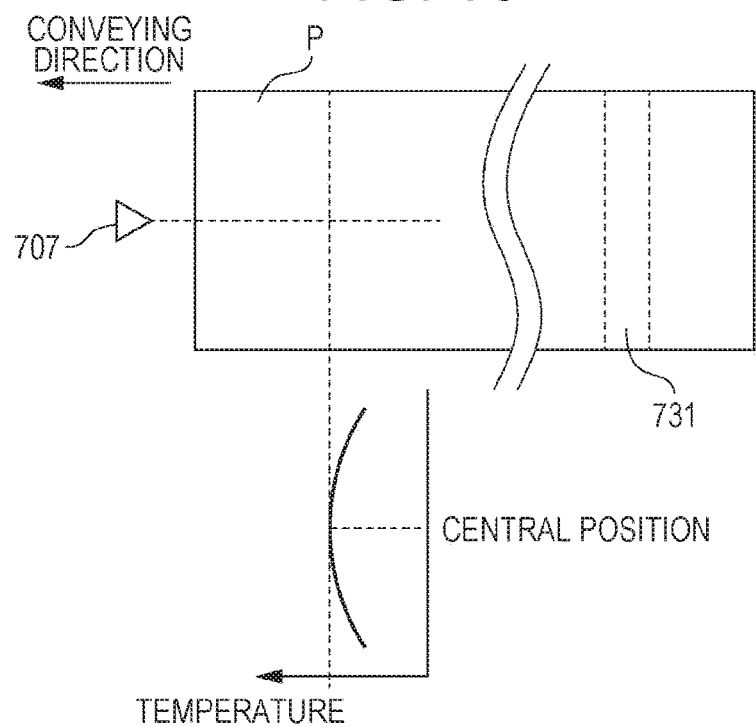
FIG. 15 is a diagram of an exemplary temperature distribution occurred in the paper medium caused by a conveying roller in the related art.
Figure 16:
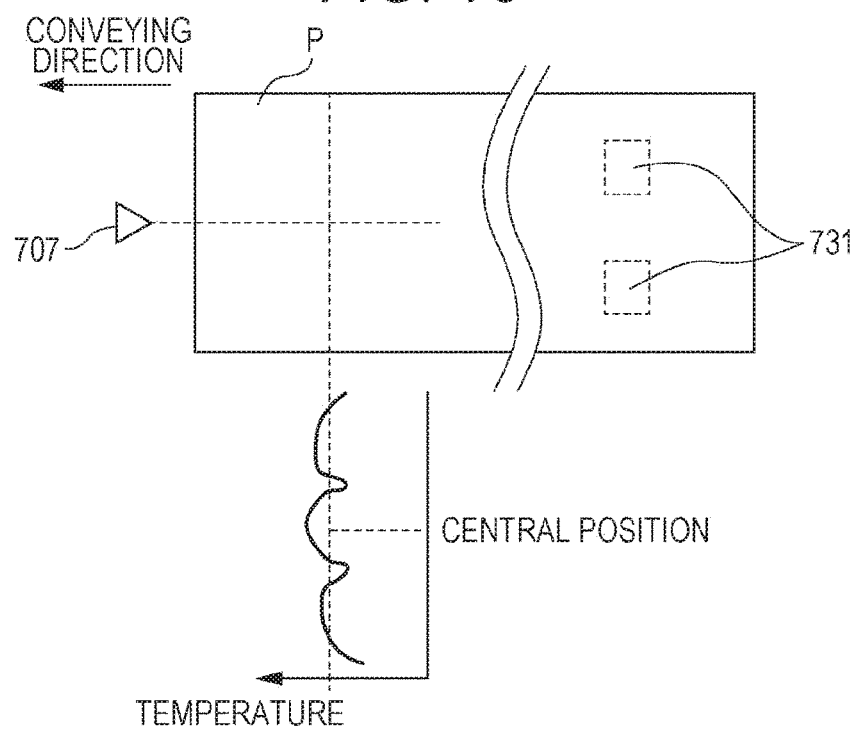
FIG. 16 is a diagram of another example of a temperature distribution occurred in the paper medium caused by the conveying roller in the related art.
Figure 17:
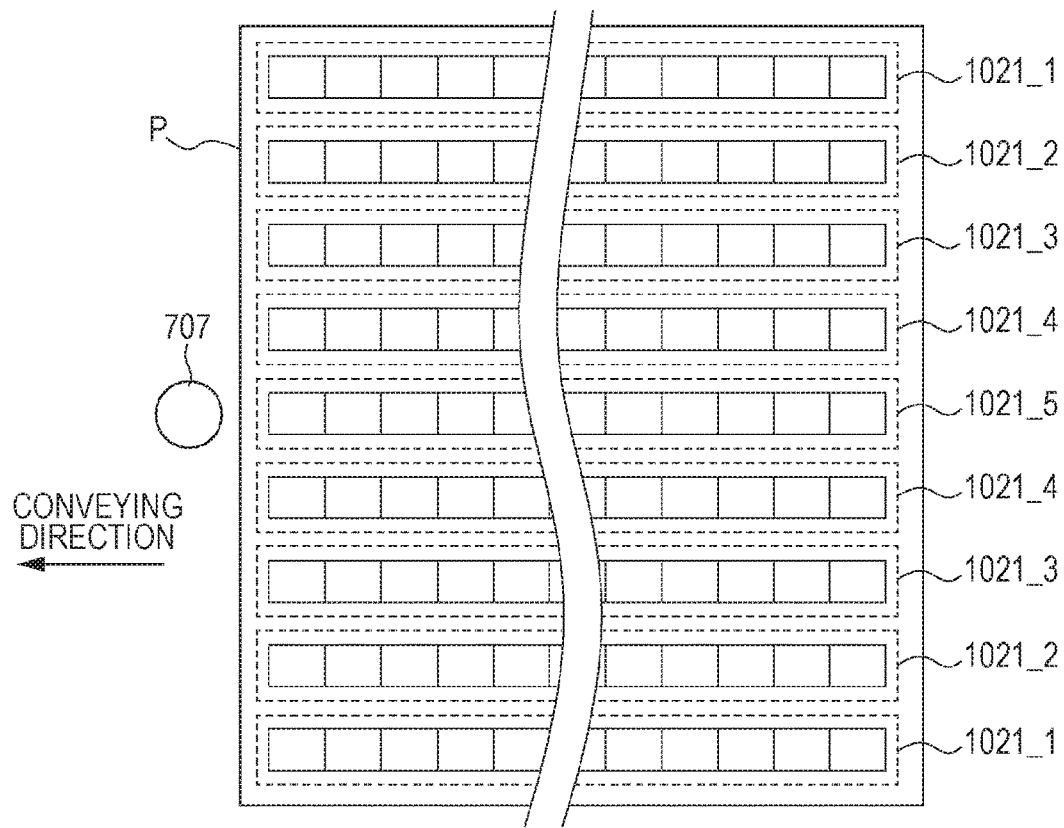
FIG. 17 is a diagram of an exemplary arrangement of patches formed on the paper medium in the related art.

Next, an operation and an effect of the present embodiment are described in comparison with the conventional example. FIG. 15 is a diagram of an exemplary temperature distribution occurred in the paper medium P caused by a conveying roller 731 in the related art. FIG. 16 is a diagram of another example of a temperature distribution occurred in the paper medium P caused by the conveying roller 731 in the related art. FIG. 17 is a diagram of an exemplary arrangement of the patches formed on the paper medium P in the related art.

As illustrated in FIG. 15, after the image has been fixed on the paper medium P and the paper medium P has passed a conveyance section of the paper medium P, the temperature distribution occurred in the paper medium P tends to prominently appear in the CD direction. One of the reasons is that heat is radiated from the outside of the conveying roller 731 and heat is radiated in the front-back direction of the machine. Therefore, the temperature of the paper medium P is high in the central part in the CD direction, and the temperature of the paper medium P is low as it approaches the end of the paper medium P. Also, under the condition that the temperature of the paper medium P is lowered to some extent, there is a tendency that temperature gradient hardly occurs in the FD direction.

As illustrated in FIG. 16, there is a case where the conveying rollers 731 are partially disposed without being disposed in the CD direction. In this case, there is a tendency that the temperature of the paper medium P is lowered at the position where the conveying roller 731 is disposed. As illustrated in FIGS. 15 and 16, the temperature distribution tends to occur in the paper medium P in the CD direction.

From the viewpoint of cost, the detector 707 is disposed in a part in the CD direction. Therefore, although the temperature detection accuracy of the paper medium P in the FD direction at the position where the detector 707 is disposed increases, as the distance from the detector 707 increases in the CD direction, the temperature detection accuracy of the paper medium P deteriorates. That is, a temperature difference is generated between the temperature of the patch on the paper medium P positioned away from the detector 707 in the CD direction and the temperature of the patch on the paper medium P detected by the detector 707.

When reading the patch or the like, the scanner 701 reads the entire section of the paper medium P by reading the image on the paper medium P traveling in the FD direction along the CD direction. Therefore, in a case where the temperature distribution occurs on the paper medium P along the CD direction, conventionally, in a state of receiving the influence of the thermochromism phenomenon, the color value of the image cannot be accurately corrected at low cost.

Also, as illustrated in FIG. 17, a patch array 1021_5 having a large influence of the thermochromism phenomenon is disposed in the FD direction in which the detector 707 is disposed. As the detector 707 moves away from the FD direction in which the detector 707 is disposed along the CD direction, patch arrays 1021_4 to 1021_1 in which the influence of the thermochromism phenomenon is reduced are disposed. With this arrangement, since the temperature of the color which is most influenced by the thermochromism phenomenon can be accurately detected, the temperature of the colorimetric value can be corrected. On the other hand, the color having less influence of the thermochromism phenomenon has less influence of the thermochromism phenomenon even when the temperature detection accuracy is deteriorated. Therefore, the color difference ΔE in a case where the temperature has been corrected can be small. As a result, the color difference ΔE is reduced as a whole.

However, the degree of freedom of patch arrangement is limited. For example, in a case where there are many patches having the large influence of the thermochromism phenomenon, the patch array 1021_1 cannot be used. As a result, the number of paper mediums P on which patches are printed is increased, and this increases the cost.

Therefore, in the present embodiment, based on the reading result by the scanner 701 and the colorimetric result by the colorimeter 703, the color difference ΔE between the colorimetric values of the same color temperature correction patches at the reference position and the comparison position is obtained. Based on the color difference ΔE and the temperature information of the reference position, a temperature distribution occurred in the paper medium P is obtained. As for the temperature distribution, as the temperature difference between the first position and the second position increases, the color difference ΔE increases.

Therefore, since the color difference ΔE can be easily converted from the temperature difference based on the temperature distribution, the influence of the thermochromism phenomenon can be accurately estimated at low cost. In addition, since it is preferable that the patches of the same color be positioned at different positions, the patches can be flexibly arranged.

Therefore, even in a state where the influence of the thermochromism phenomenon is received, the restriction on the arrangement of the patches can be improved while the color value of the image is accurately corrected at low cost.

In addition, the image forming system 1 does not arrange the patches so as to reduce the color difference ΔE to reduce the influence of the thermochromism phenomenon, and it is preferable that the correction processing according to the color difference ΔE caused by the influence of the thermochromism phenomenon be performed. Therefore, the color difference ΔE may be generated. Therefore, since it is not necessary to predict the increase in the color difference ΔE and previously restrict the arrangement of the patches, the restriction of the arrangement of the patches becomes small.

Also, in the present embodiment, the correction temperature difference between the correction reference temperature and the temperature of the color correction patch is obtained based on the temperature distribution. Based on the correction temperature difference and the reference color difference ΔE', the reading result of the color correction patch is corrected. The color of the image is formed based on the association between the reading result of the corrected color correction patch and the colorimetric result of the color correction patch.

Therefore, since the color of the image is formed in a state where the influence of the thermochromism phenomenon is corrected, the image having the intended colors can be printed.

In the present embodiment, the temperature correction patches are formed so that reference position and the comparison position are opposed to each other, and the plurality of temperature correction patches are formed along at least one of the FD direction of the paper medium P and the CD direction of the FD direction.

Therefore, the temperature correction patch is also formed at a position where the temperature changes due to heat radiation. Therefore, the temperature distribution occurred in the paper medium P can be accurately obtained.

In the present embodiment, a color having a greater degree of the influence of the thermochromism phenomenon than the color correction patch is allocated to the temperature correction patch. Therefore, the sensitivity of the temperature difference corresponding to the color difference ΔE increases. Therefore, the accuracy of the temperature distribution occurred in the paper medium P can be further improved.

Second Embodiment

In the second embodiment, the same components as those of the first embodiment are denoted with the same reference numerals, and description of the above components is omitted. In the second embodiment, a temperature correction patch is formed on a paper medium P along the FD direction.

Figure 10:
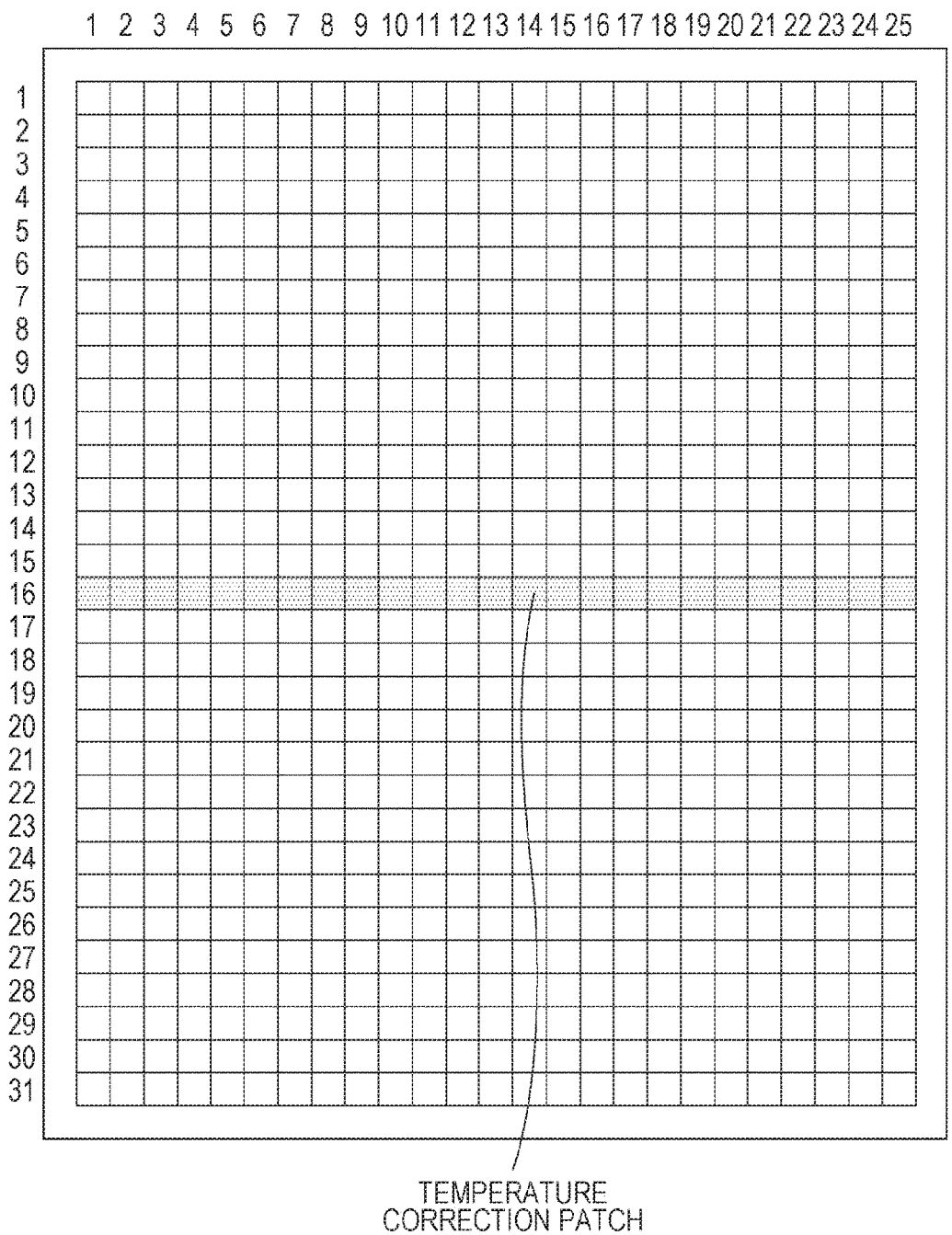
FIG. 10 is a diagram of an exemplary temperature correction patch formed on a paper medium according to a second embodiment of the present invention.

FIG. 10 is a diagram of an exemplary temperature correction patch formed on the paper medium P according to the second embodiment of the present invention. As illustrated in FIG. 10, the temperature correction patch is formed in a row of CD (16) along the FD direction. In this case, a detector 707 can detect the temperature of the temperature correction patch formed on each of CD (16)/FD (1) to CD (16)/FD (25). Therefore, since a temperature change in the FD direction can be detected, more accurate thermochromism correction can be executed.

Third Embodiment

In a third embodiment, the same components as those in the first and second embodiments are denoted with the same reference numerals, and description of the above components is omitted. In the third embodiment, a temperature correction patch is formed on a paper medium P along the CD direction, and a temperature correction patch is formed on the paper medium P along the FD direction.

Figure 11:
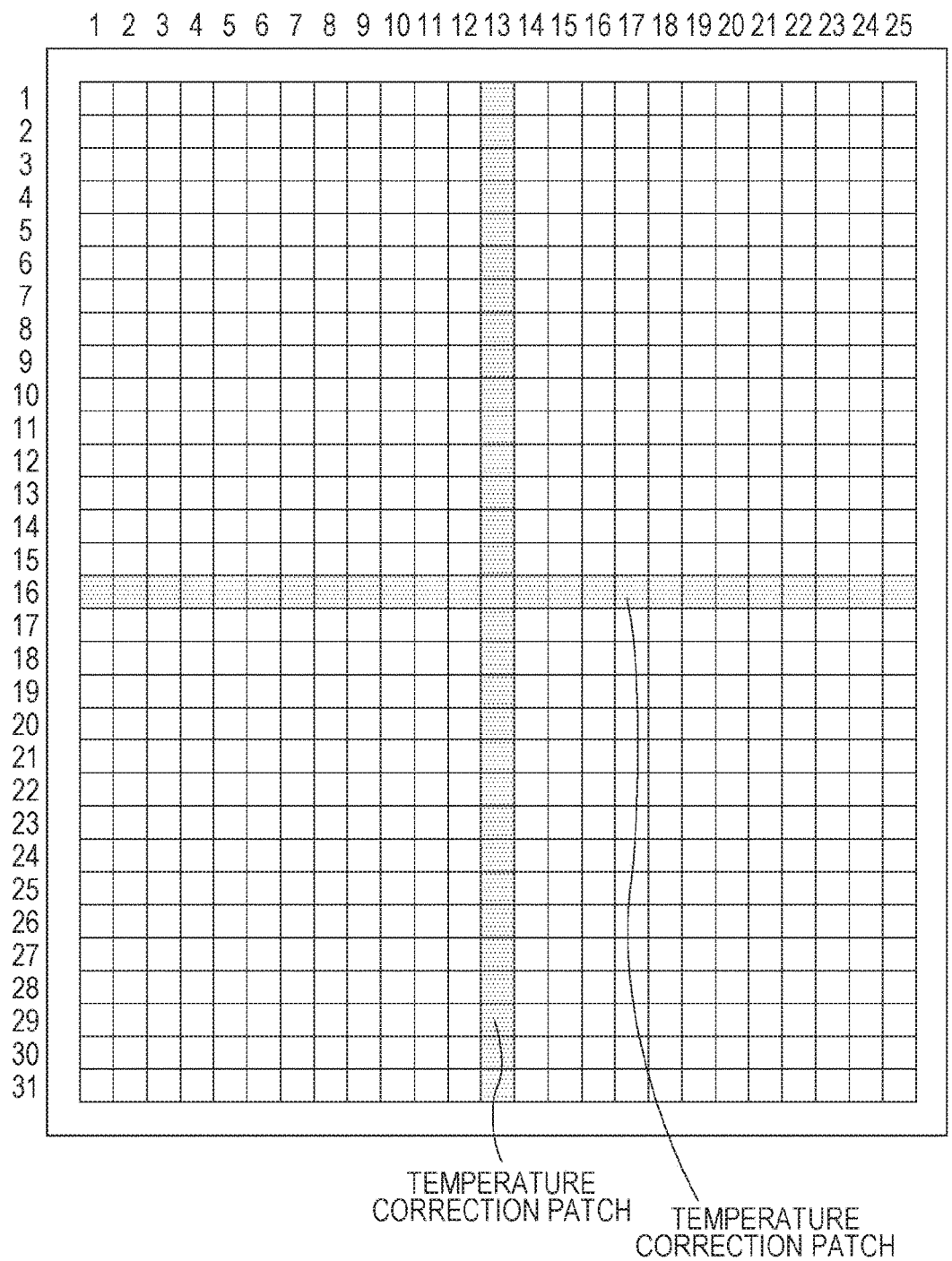
FIG. 11 is a diagram of an exemplary temperature correction patch formed on a paper medium according to a third embodiment of the present invention.

FIG. 11 is a diagram of an exemplary temperature correction patch formed on the paper medium P according to the third embodiment of the present invention. As illustrated in FIG. 11, the temperature correction patch is formed in a column of FD (13) along the CD direction. In addition, the temperature correction patch is formed in the row of CD (16) along the FD direction. In this case, since a temperature difference along the CD direction and a temperature difference along the FD direction can be obtained, the temperatures of the temperature correction patches in both the CD direction and the FD direction can be estimated. Therefore, the temperature distribution occurred in the paper medium P can be more particularly estimated.

Fourth Embodiment

In a fourth embodiment, the same components as those in the first to third embodiments are denoted with the same reference numerals, and description of the above components is omitted. In the fourth embodiment, formation intervals of the temperature correction patches are different from those in the first to third embodiments.

Figure 12:
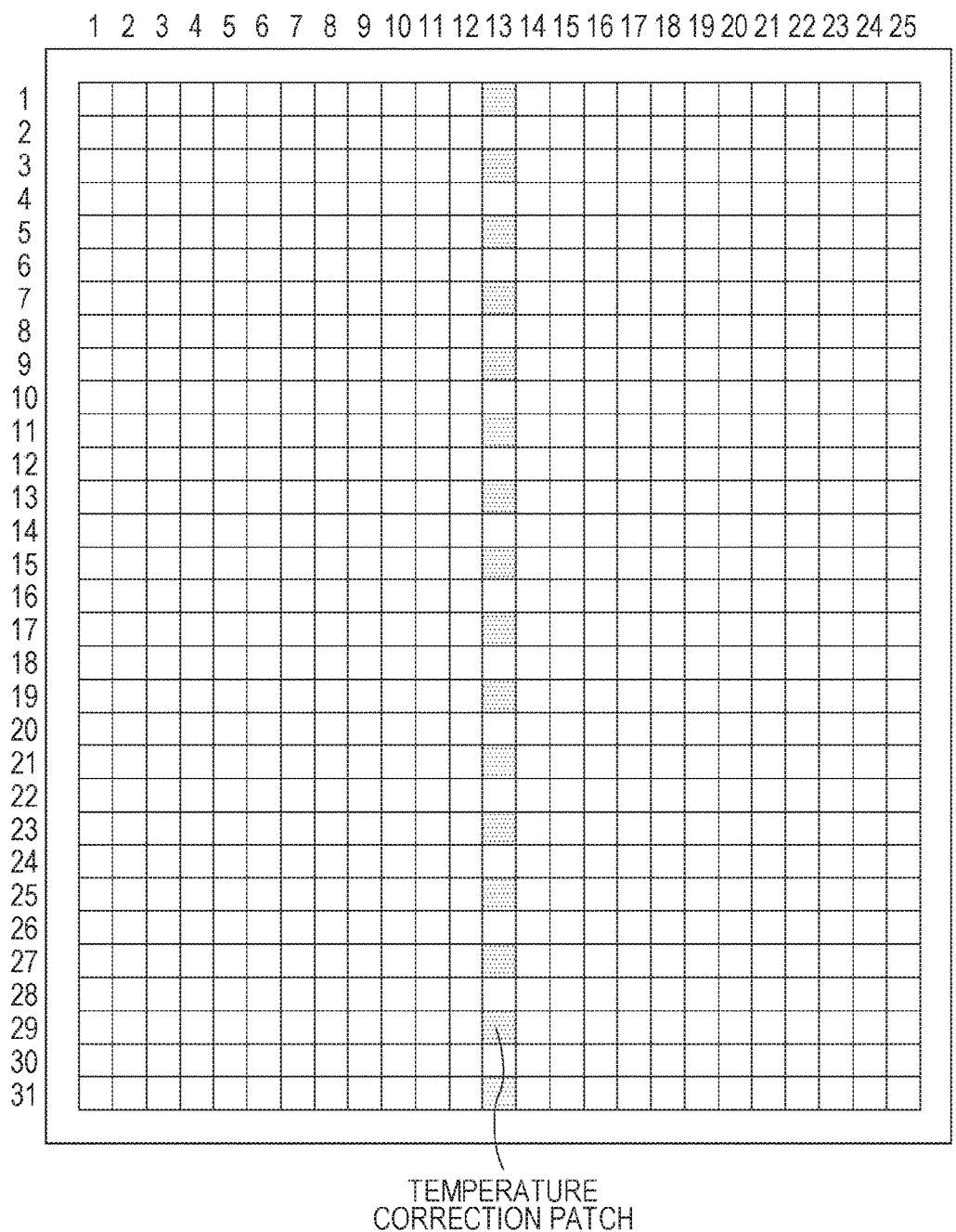
FIG. 12 is a diagram of an exemplary temperature correction patch formed on a paper medium according to a fourth embodiment of the present invention.

FIG. 12 is a diagram of an exemplary temperature correction patch formed on a paper medium P according to the fourth embodiment of the present invention. As illustrated in FIG. 12, the temperature correction patches are formed at a constant pitch. Therefore, the loss of the temperature correction patch measured for each sheet of paper medium P can be reduced. Note that it is preferable that interpolation processing be performed by a calculating a moving average and the like with respect to a position where temperature correction patches of the same color are not formed.

Fifth Embodiment

In a fifth embodiment, the same components as those in the first to fourth embodiments are denoted with the same reference numerals, and description of the above components is omitted. In the fifth embodiment, two columns of temperature correction patches formed along the CD direction are formed as respectively having different FD coordinates.

FIG. 12 is a diagram of an exemplary temperature correction patch formed on the paper medium P according to the fifth embodiment of the present invention. As illustrated in FIG. 12, the temperature correction patches are formed in one column on CD (1)/FD (7) to CD (31)/FD (7) and one column in CD (1)/FD (19) to CD (31)/FD (19). Therefore, a temperature gradient occurred in the temperature correction patch in the FD direction can be calculated.

Sixth Embodiment

In a sixth embodiment, the same components as those in the first to fifth embodiments are denoted with the same reference numerals, and description of the above components is omitted. In the sixth embodiment, a detector 707 is disposed at a position different from those of the first to fifth embodiments.

Figure 13:
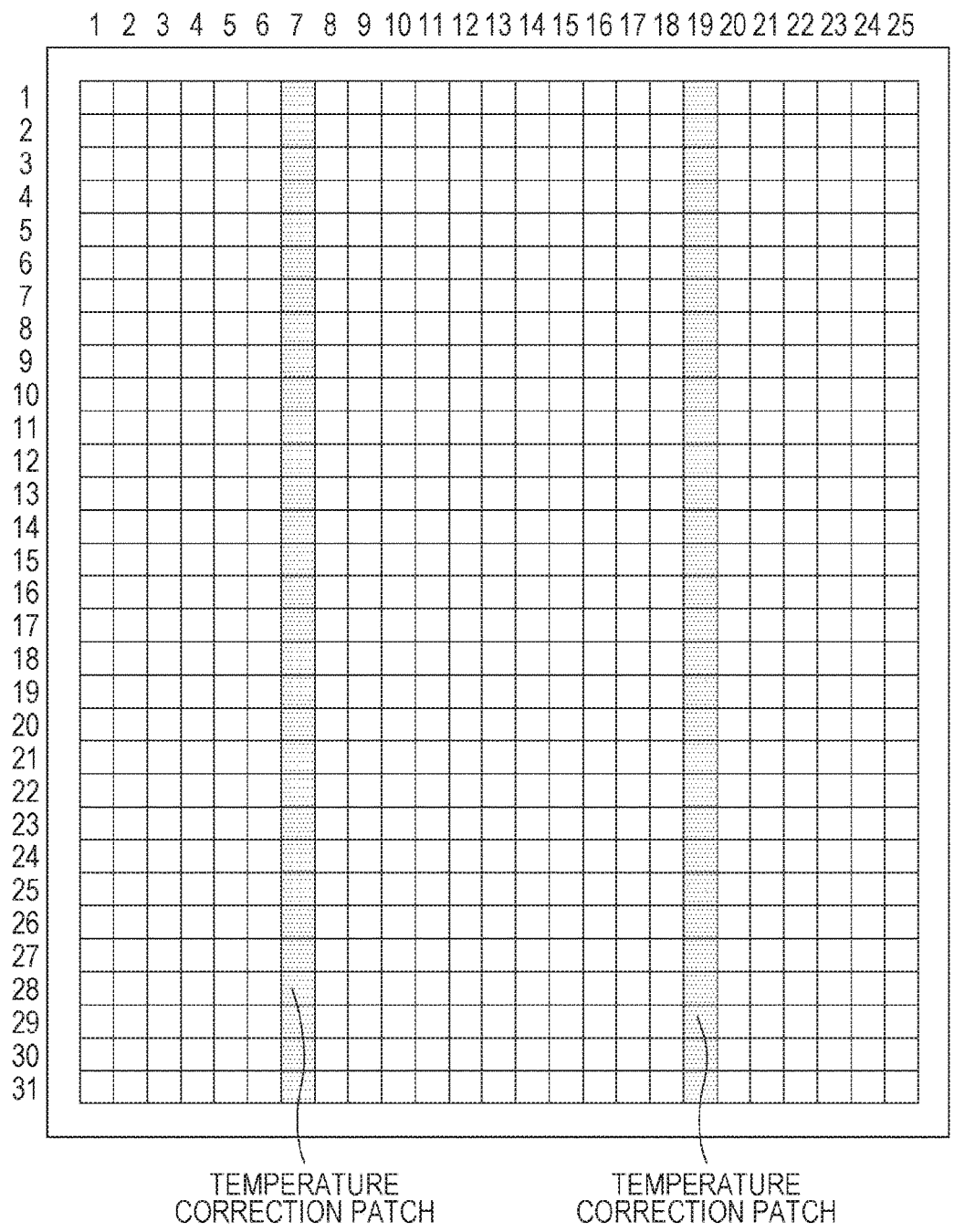
FIG. 13 is a diagram of an exemplary temperature correction patch formed on a paper medium according to a fifth embodiment of the present invention.
Figure 14:
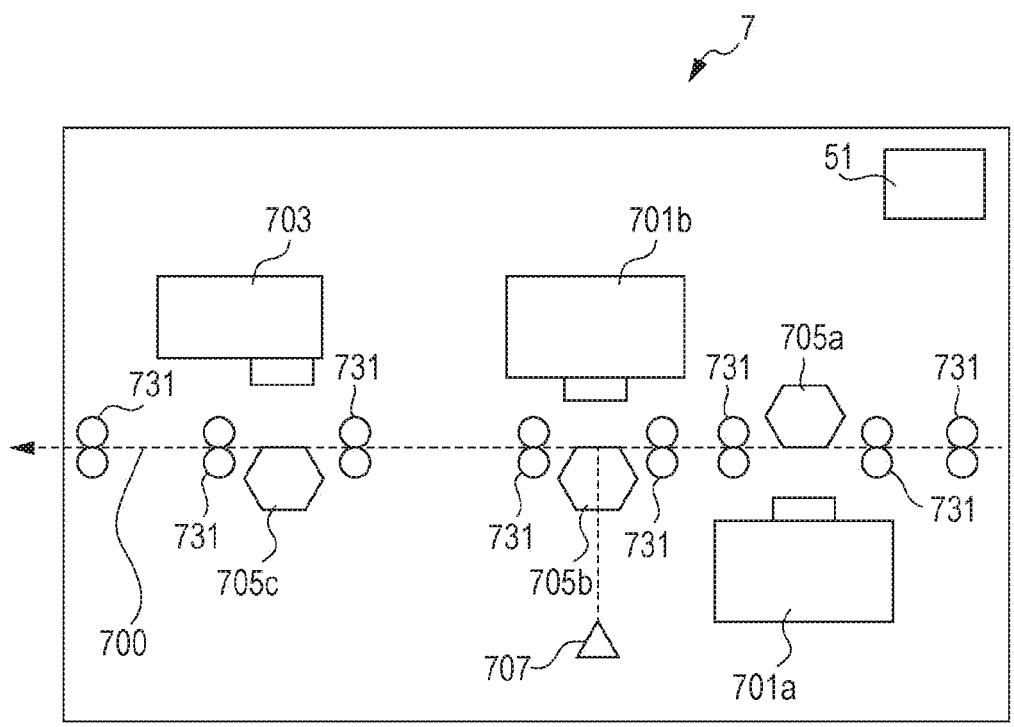
FIG. 14 is a diagram of an exemplary structure of an image reading apparatus according to a sixth embodiment of the present invention.

FIG. 13 is a diagram of an exemplary structure of an image reading apparatus 7 according to the sixth embodiment of the present invention. As illustrated in FIG. 13, the detector 707 is disposed to be opposed to a scanner 701*b*. Therefore, the scanner 701*b* reads an image formed on a paper medium P, and at the same time, a temperature of the image formed on the paper medium P can be read. Therefore, the temperature can be detected while reading the image at the same time. Therefore, the overall operation time can be shortened.

Although the image forming apparatus 5 and the image reading apparatus 7 according to the present invention have been described above based on the embodiments, the present invention is not limited to the embodiments. The present invention can be changed without departing from the scope of the present invention.

For example, in the present embodiment, an example has been described in which the detector 707 is realized by a thermopile sensor and detects the radiation temperature. However, the detector 707 is not particularly limited to the above. For example, the detector 707 may estimate the temperature on the paper medium P by detecting an ambient temperature.

In addition, an example has been described in which the detector 707 is disposed on the row of CD (16). However, the position of the detector 707 is not limited to the above, and the detector 707 may be disposed on the other CD column if the detector 707 is disposed on the paper medium P.

In addition, an example has been described in which the image reading signal Sout is determined by the RGB color system as the digital image data including the R, G, and B color components. However, the image reading signal Sout is not limited to the above, and the image reading signal Sout may be determined by a different system represented by the CIELAB color space.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming system comprising:
an image forming apparatus; and
an image reading apparatus that reads an image to bo formed on a paper medium by the image forming apparatus, wherein
on the paper medium,
temperature correction patches with the same color are formed at a reference position and a comparison position different from the reference position as the image,
the image reading apparatus includes:
a scanner that reads respective colors of the temperature correction patch at the reference position and the temperature correction patch at the comparison position; and
a colorimeter that performs colorimetry to the temperature correction patch at the reference position,
the image forming apparatus includes:
a detector that detects a temperature of the temperature correction patch at the reference position;
a first calculator that calculates a color difference between a color value of the temperature correction patch at the reference position and a color value of the temperature correction patch at the comparison position based on the reading result by the scanner and the colorimetric result by the colorimeter; and
a second calculator that calculates a temperature distribution occurred in the paper medium based on the temperature of the temperature correction patch detected by the detector and the color difference calculated by the first calculator.

2. The image forming system according to claim 1, wherein
on the paper medium,
color correction patches having different colors are formed over an entire image formable range as the image, in addition to the temperature correction patches having the same color,
the colorimeter performs colorimetry to the color correction patches in a specific column from among the color correction patches, and
the image forming apparatus further includes:
a creator that creates related information for associating a colorimetric result of the color correction patch in the specific column by the colorimeter with a reading result of the color correction patches over the entire image formable range by the scanner;
a temperature corrector that obtains a correction temperature difference between a correction reference temperature and the temperature of the color correction patch based on the temperature distribution calculated by the second calculator;
an image corrector that corrects the colorimetric result of the color correction patch based on the correction temperature difference obtained by the temperature corrector and a reference color difference of a colorimetry target color corresponding to the correction reference temperature; and
an image forming part that forms colors of the image over the entire image formable range based on the colorimetric result of the color correction patch corrected by the color correction patch and the related information created by the creator.

3. The image forming system according to claim 2, wherein
in the temperature correction patch,
the reference position is opposed to the comparison position, and
the plurality of temperature correction patches is formed at the comparison position along at least one of a traveling direction of the paper medium and a perpendicular direction perpendicular to the traveling direction of the paper medium.

4. The image forming system according to claim 3, wherein
a color having larger degree of an influence of a thermochromism phenomenon than that of the color correction patch is allocated to the temperature correction patch.

5. The image forming system according to claim 1, wherein
on the paper medium,
color correction patches having different colors are formed as the image, in addition to the temperature correction patches.

6. The image forming system according to claim 1, wherein
the colorimeter performs colorimetry to the color correction patches in a specific column from among the color correction patches.

7. The image forming system according to claim 1, wherein
the plurality of temperature correction patches is formed along a perpendicular direction perpendicular to the traveling direction of the paper medium.

8. The image forming system according to claim 1, wherein
an image corrector that corrects the colorimetric result of the color correction patch; and
an image forming part that forms the image based on the colorimetric result of the color correction patch corrected by the color correction patch.

9. An image reading apparatus for reading temperature correction patches formed on a reference position of a paper medium and a comparison position that is different from the reference position, comprising:
- a scanner that reads colors of the temperature correction patch at the reference position and the temperature correction patch at the comparison position; and
- a colorimeter that performs colorimetry to the temperature correction patch at the reference position, wherein
- a temperature distribution in the paper medium is determined based on temperature information on the temperature correction patch at the reference position and a color difference between a color value of the temperature correction patch at the reference position and a color value of the temperature correction patch at the comparison position based on a reading result by the scanner and a colorimetric result by the colorimeter.

10. The image reading apparatus according to claim 9, wherein
on the paper medium,
color correction patches having different colors are formed over an entire image formable range as the image, in addition to the temperature correction patches having the same color,
the colorimeter performs colorimetry to the color correction patches in a specific column from among the color correction patches, and
the image forming apparatus further includes:
a creator that creates related information for associating a colorimetric result of the color correction patch in the specific column by the colorimeter with a reading result of the color correction patches over the entire image formable range by the scanner;
a temperature corrector that obtains a correction temperature difference between a correction reference temperature and the temperature of the color correction patch based on the temperature distribution calculated by the second calculator;
an image corrector that corrects the colorimetric result of the color correction patch based on the correction temperature difference obtained by the temperature corrector and a reference color difference of a colorimetry target color corresponding to the correction reference temperature; and
an image forming part that forms colors of the image over the entire image formable range based on the colorimetric result of the color correction patch corrected by the color correction patch and the related information created by the creator.

11. The image reading apparatus according to claim 10, wherein
in the temperature correction patch,
the reference position is opposed to the comparison position, and
the plurality of temperature correction patches is formed at the comparison position along at least one of a traveling direction of the paper medium and a perpendicular direction perpendicular to the traveling direction of the paper medium.

12. The image reading apparatus according to claim 11, wherein
a color having larger degree of an influence of a thermochromism phenomenon than that of the color correction patch is allocated to the temperature correction patch.

13. An image forming apparatus for causing an image reading apparatus to read an image to be formed on a paper medium, comprising:
- an image forming part that forms temperature correction patches having the same color on the paper medium at a reference position and a comparison position different from the reference position as the image;
- a first calculator that calculates a color difference between a color value of the temperature correction patch at the reference position and a color value of the temperature correction patch at the comparison position, the color values being obtained from a scanner that reads colors of the temperature correction patch at the reference position and the temperature correction patch at the comparison position and a colorimeter that performs colorimetry to the temperature correction patch at the reference position; and
- a second calculator that calculates a temperature distribution occurred in the paper medium based on temperature information of the temperature correction patch at the reference position and the color difference calculated by the first calculator.

14. The image forming apparatus according to claim 13, wherein
on the paper medium,
color correction patches having different colors are formed over an entire image formable range as the image, in addition to the temperature correction patches having the same color,
the colorimeter performs colorimetry to the color correction patches in a specific column from among the color correction patches, and
the image forming apparatus further includes:
a creator that creates related information for associating a colorimetric result of the color correction patch in the specific column by the colorimeter with a reading result of the color correction patches over the entire image formable range by the scanner;
a temperature corrector that obtains a correction temperature difference between a correction reference temperature and the temperature of the color correction patch based on the temperature distribution calculated by the second calculator;
an image corrector that corrects the colorimetric result of the color correction patch based on the correction temperature difference obtained by the temperature corrector and a reference color difference of a colorimetry target color corresponding to the correction reference temperature; and
an image forming part that forms colors of the image over the entire image formable range based on the colorimetric result of the color correction patch corrected by the color correction patch and the related information created by the creator.

15. The image forming apparatus according to claim 14, wherein
in the temperature correction patch,
the reference position is opposed to the comparison position, and
the plurality of temperature correction patches is formed at the comparison position along at least one of a traveling direction of the paper medium and a perpendicular direction perpendicular to the traveling direction of the paper medium.

16. The image reading apparatus according to claim 15, wherein
a color having larger degree of an influence of a thermochromism phenomenon than that of the color correction patch is allocated to the temperature correction patch.

17. An image forming system comprising:
an image forming apparatus that forms first patch and second patch different from the first patch on a medium, the second patch having the same color as the first patch;
an image reading apparatus that reads the first patch and the second patch formed on a paper medium by the image forming apparatus;
a detector that detects a temperature of the first patch;
a first calculator that calculates a color difference between a color value of the first patch and a color value of the second patch based on the reading result by the image reading apparatus; and
a second calculator that calculates a temperature distribution occurred in the medium based on the temperature of the first patch detected by the detector and the color difference calculated by the first calculator.

18. The image forming system according to claim 17, wherein
on the medium,
color correction patches having different colors are formed, in addition to the first patch and the second patch.

19. The image forming system according to claim 17, wherein
a plurality of the second patch is formed at the comparison position along at least one of a traveling direction of the medium and a perpendicular direction perpendicular to the traveling direction of the medium.

20. The image forming system according to claim 18, wherein
a color having larger degree of an influence of a thermochromism phenomenon than that of the color correction patch is allocated to the first patch and the second patch.

21. The image forming system according to claim 17, wherein
the plurality of the second patch is formed along a perpendicular direction perpendicular to the traveling direction of the medium.

22. The image forming system according to claim 18, wherein
an image corrector that corrects the reading result of the color correction patch; and
an image forming part that forms an image based on the reading result of the color correction patch corrected by the color correction patch.

* * * * *